US009765940B2

(12) United States Patent
Kanayama et al.

(10) Patent No.: US 9,765,940 B2
(45) Date of Patent: Sep. 19, 2017

(54) LIGHTING APPARATUS AND AUTOMOBILE INCLUDING THE SAME

(71) Applicant: PANASONIC INTELLECTUAL PROPERTY MANAGEMENT CO., LTD., Osaka (JP)

(72) Inventors: Yoshihiko Kanayama, Hyogo (JP); Hiro Aoki, Osaka (JP); Makoto Kai, Kyoto (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 14/688,194

(22) Filed: Apr. 16, 2015

(65) Prior Publication Data

US 2015/0323145 A1 Nov. 12, 2015

(30) Foreign Application Priority Data

May 9, 2014 (JP) ................................ 2014-098148

(51) Int. Cl.
*B60Q 1/00* (2006.01)
*F21S 8/10* (2006.01)

(52) U.S. Cl.
CPC ......... *F21S 48/328* (2013.01); *F21S 48/1104* (2013.01); *F21S 48/1154* (2013.01); *F21S 48/1159* (2013.01); *F21S 48/1225* (2013.01); *F21S 48/1241* (2013.01); *F21S 48/1258* (2013.01); *F21S 48/13* (2013.01); *F21S 48/1329* (2013.01); *F21S 48/145* (2013.01); *F21S 48/1747* (2013.01); *F21S 48/321* (2013.01)

(58) Field of Classification Search
CPC ............... F21S 48/1154; F21S 48/1159; F21S 48/1163; F21S 48/1225; F21S 48/13; F21S 48/145; F21S 48/321; F21S 48/32; F21S 48/328
See application file for complete search history.

(56) References Cited

U.S. PATENT DOCUMENTS 7,156,544 B2 1/2007 Ishida
2005/0068787 A1* 3/2005 Ishida ..................... B60Q 1/14 362/538

(Continued)

FOREIGN PATENT DOCUMENTS

JP 2005-108554 4/2005

OTHER PUBLICATIONS

U.S. Appl. No. 14/693,152 to Kanayama et al., filed Apr. 22, 2015.

*Primary Examiner* — Ali Alavi
(74) *Attorney, Agent, or Firm* — Greenblum & Bernstein, P.L.C.

(57) ABSTRACT

A lighting apparatus for vehicle use that projects light forward includes: a base; a low beam light emitting device disposed on the base; a high beam light emitting device disposed on the base; a lens body disposed in front of the low beam light emitting device and the high beam light emitting device; and a first light restrictor disposed in front of the high beam light emitting device, the first light restrictor restricting light emitted by the high beam light emitting device from traveling downward.

18 Claims, 17 Drawing Sheets

(56) References Cited

U.S. PATENT DOCUMENTS

| | | | | |
|---|---|---|---|---|
| 2006/0120094 | A1* | 6/2006 | Tsukamoto | F21S 48/1159 362/518 |
| 2009/0097268 | A1* | 4/2009 | Mochizuki | F21S 48/1159 362/538 |
| 2009/0290372 | A1* | 11/2009 | Kotajima | F21S 48/1159 362/539 |
| 2010/0208483 | A1* | 8/2010 | Hamashima | B60Q 1/068 362/520 |
| 2012/0134167 | A1* | 5/2012 | Huang | B60Q 1/0041 362/519 |

* cited by examiner

LIGHTING APPARATUS AND AUTOMOBILE INCLUDING THE SAME

CROSS REFERENCE TO RELATED APPLICATION

This application claims the benefit of priority of Japanese Patent Application Number 2014-098148, filed May 9, 2014, the entire content of which is hereby incorporated by reference.

BACKGROUND OF THE INVENTION

1. Field of the Invention

The present disclosure relates to a lighting apparatus and an automobile including the lighting apparatus.

2. Description of the Related Art

Vehicles such as automobiles are equipped with headlights in the front. These headlights include a housing (chassis) and a lighting apparatus attached to the housing.

Lighting apparatuses used in vehicle headlights include, for example, a base, a low beam light emitting device and a high beam light emitting device disposed on the base, and a lens positioned in front of the low beam light emitting device and the high beam light emitting device (see Japanese Unexamined Patent Application Publication No. 2005-108554).

Examples of conventional low beam light emitting devices and high beam light emitting devices used include high intensity discharge (HID) lamps. In recent years, due to the luminous efficiency and long lifespan of light emitting diodes (LEDs), which exceed HID lamps, lighting apparatuses using LEDs as the low beam light emitting devices and high beam light emitting devices have been researched and developed.

SUMMARY OF THE INVENTION

With the conventional lighting apparatus described above, power consumption cannot be reduced.

For example, when the high beam light emitting device is used, a wide area, spanning from directly in front of the driver to far away from the driver, must be brightly illuminated. To brightly illuminate this wide area, the high beam light emitting device must output enough light to achieve an extremely high illuminance, which results in excessive power consumption.

An object of the present disclosure is to provide a lighting apparatus and automobile capable of reducing power consumption.

In order to achieve the aforementioned object, according to one aspect of the present disclosure, a lighting apparatus for vehicle use that projects light forward is provided. The lighting apparatus includes: a base; a low beam light emitting device disposed on the base; a high beam light emitting device disposed on the base; a lens body disposed in front of the low beam light emitting device and the high beam light emitting device; and a first light restrictor disposed in front of the high beam light emitting device. The first light restrictor restricts light emitted by the high beam light emitting device from traveling downward.

Accordingly, power consumption can be reduced.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENT

Hereinafter, a lighting apparatus and automobile according to an embodiment are described in detail with reference to the accompanying drawings. Note that the embodiment described below shows a specific preferred example of the present disclosure. Therefore, the numerical values, shapes, materials, structural elements, arrangement and connection of the structural elements, etc., shown in the following embodiment are mere examples, and are not intended to limit the present disclosure. Consequently, among the structural elements in the following embodiment, elements not recited in any one of the independent claims which indicate the broadest concepts of the present disclosure are described as arbitrary structural elements.

As described herein, "front" and "forward" refer to the direction in which light is emitted from the lighting apparatus (i.e., the light-emitting direction) and the light-extraction direction in which light is extracted, and "back" and "behind" refer to the direction opposite the front/forward direction. Furthermore, "front" and "forward" refer to the direction of travel when an automobile moves forward, "right" and "left" are from the perspective of the driver, "up", "upward", and "above" refer to the direction toward the ceiling of the automobile, and "down", "downward", and "below" refer to the direction opposite the up/upward/above direction. Additionally, the Z axis corresponds to the antero-posterior directions, the Y axis corresponds to the up and down (vertical) directions, and the X axis corresponds to the left and right (horizontal, lateral) directions.

Note that the respective figures are schematic diagrams and are not necessarily precise illustrations. Additionally, like structural elements share the same reference numbers.

Embodiment

Figure 1:
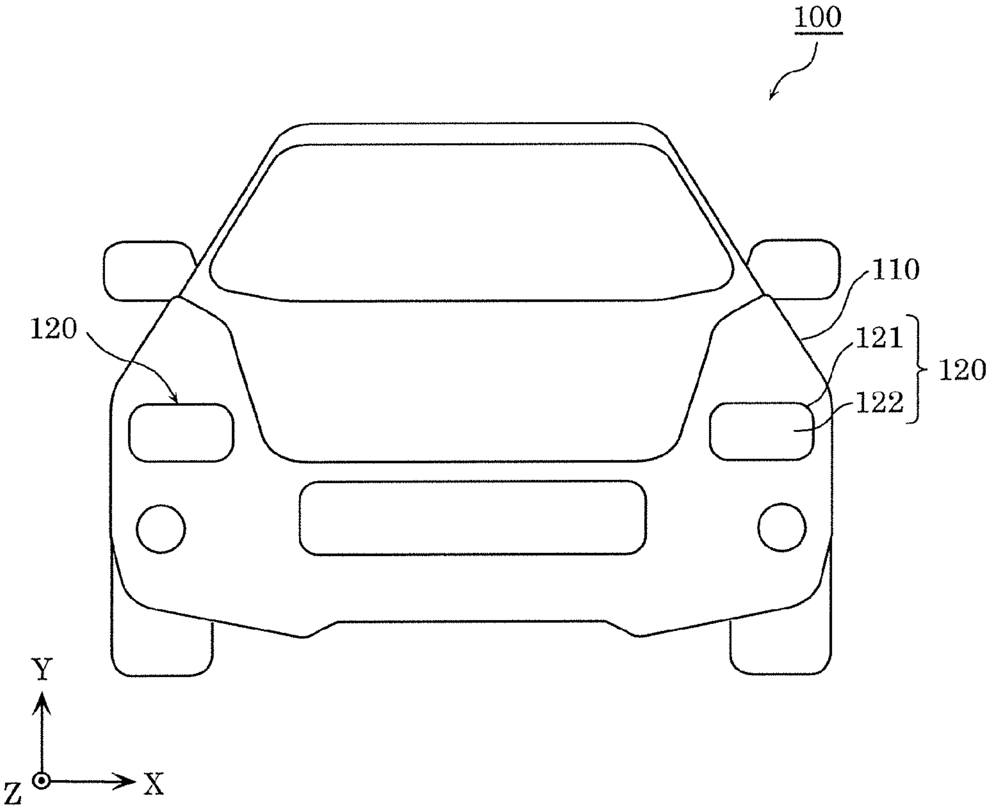
FIG. 1 is a front view of an automobile according to an embodiment of the present disclosure.

First, automobile 100 according to an embodiment will be described with reference to FIG. 1. FIG. 1 is a front view of the automobile according to the embodiment.

As illustrated in FIG. 1, automobile 100 is one example of a vehicle, such as a four-wheeled automobile, and includes vehicle body 110 and a pair of headlights 120 disposed on the left and right sides of the front of vehicle body 110. Automobile 100 is, for example, an automobile propelled by a gasoline engine or an automobile propelled by an electric engine.

In the embodiment, headlights 120 are headlight assemblies used in a vehicle and include housing 121, front cover 122, and a lighting apparatus (not shown in FIG. 1) that is attached to housing 121 behind front cover 122.

Housing 121 is, for example, a metal chassis and has an opening from which light emitted from the lighting apparatus exits. Front cover 122 is a headlight cover that transmits light and covers the opening of housing 121. Housing 121 and front cover 122 are sealed together so as to keep water and dust from entering housing 121.

The lighting apparatus is disposed behind front cover 122 and attached to housing 121. The light emitted by the lighting apparatus transmits through front cover 122 and travels outward.

Lighting Apparatus

Figure 2:
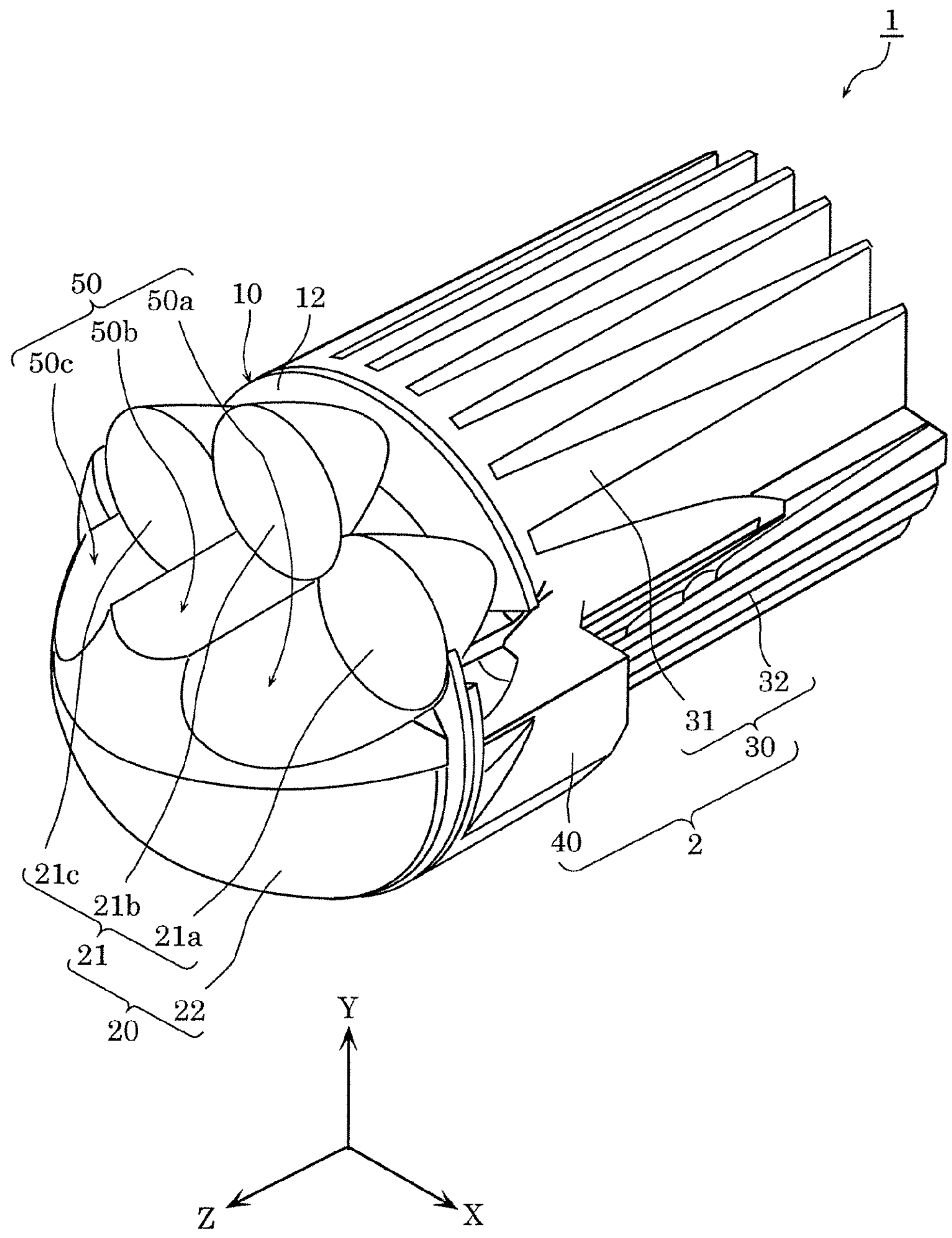
FIG. 2 is a perspective view of a lighting apparatus according to an embodiment of the present disclosure.
Figure 3:
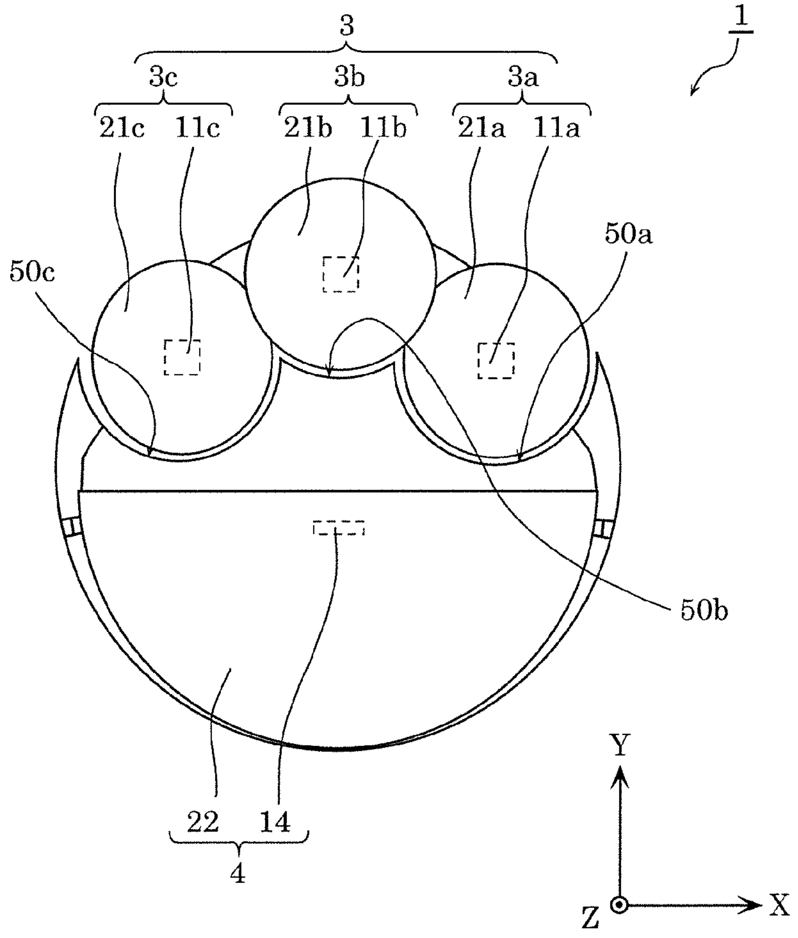
FIG. 3 is a front view of a lighting apparatus according to an embodiment of the present disclosure.
Figure 4:
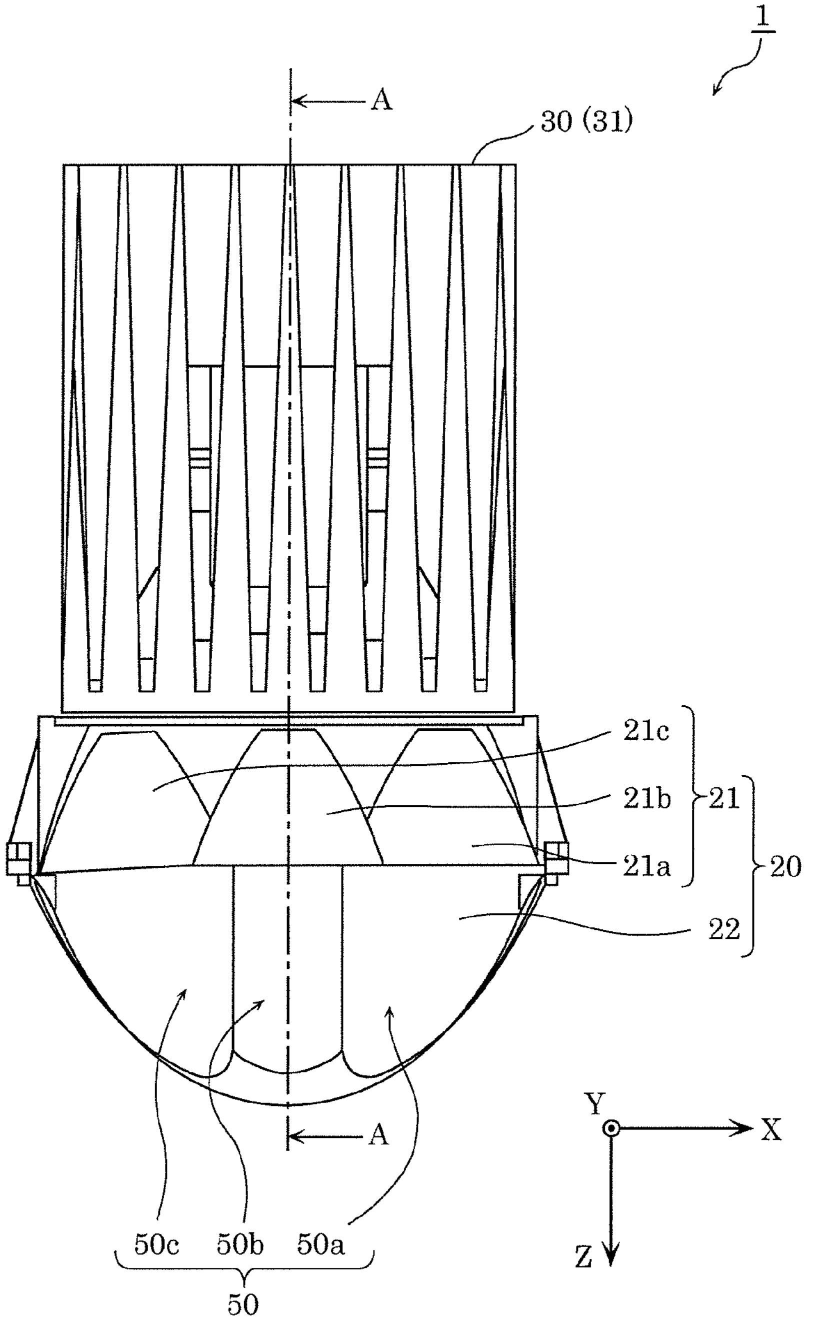
FIG. 4 is a top view of a lighting apparatus according to an embodiment of the present disclosure.
Figure 5:
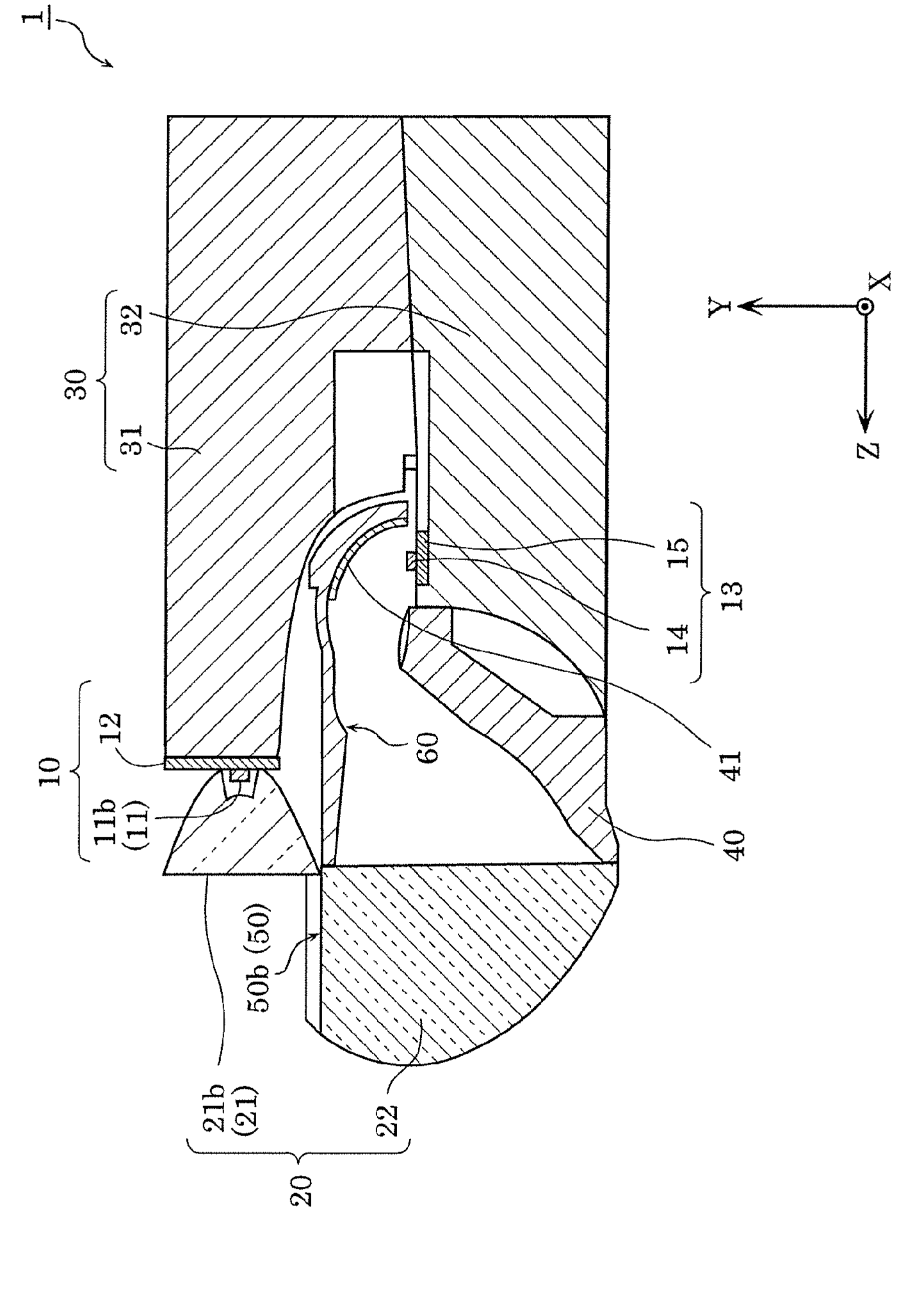
FIG. 5 is a cross sectional view of a lighting apparatus according to an embodiment of the present disclosure taken at line A-A in FIG. 4.
Figure 6:
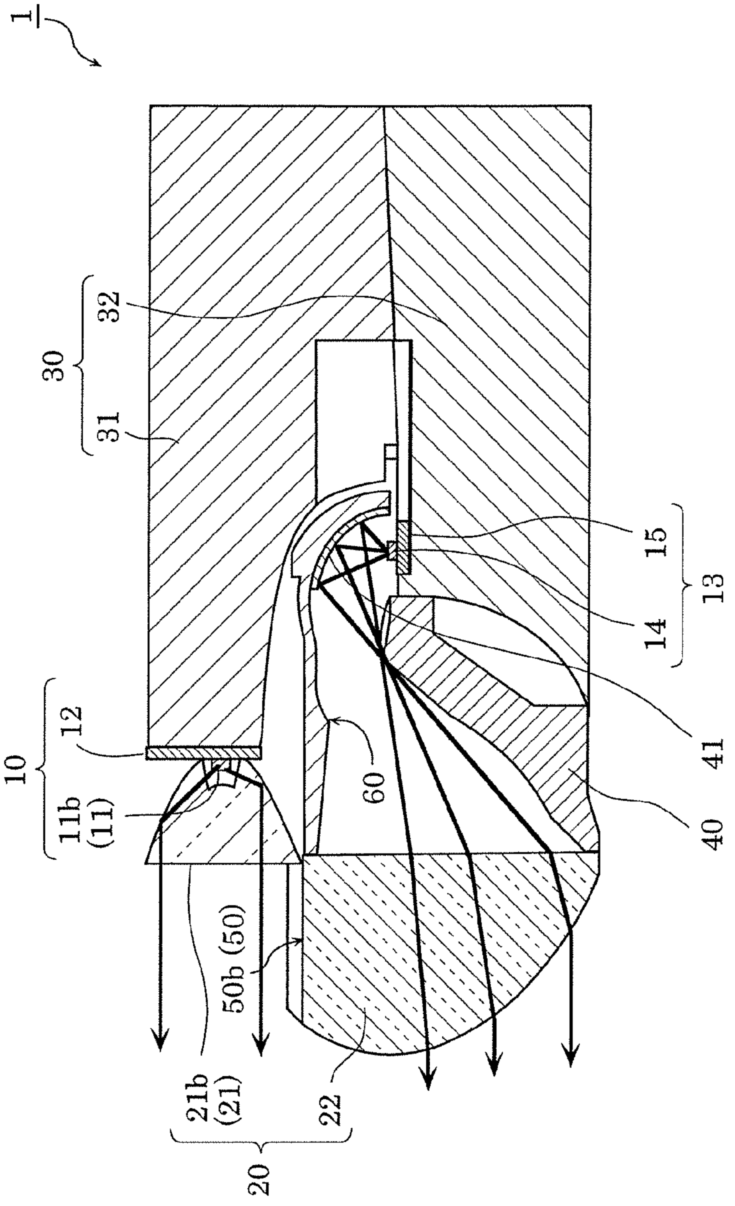
FIG. 6 is a cross sectional view of a lighting apparatus according to an embodiment of the present disclosure taken at line A-A in FIG. 4, illustrating paths of light emitted when the high beams and low beams are in use.

Next, lighting apparatus 1 according to the embodiment will be described with reference to FIG. 2 through FIG. 6. FIG. 2 is a perspective view of the lighting apparatus according to the embodiment. FIG. 3 is a front view of the lighting apparatus. FIG. 4 is a plan view of the lighting apparatus. FIG. 5 is a cross sectional view of the lighting apparatus taken at line A-A in FIG. 4. FIG. 6 is a cross sectional view of the lighting apparatus taken at line A-A in FIG. 4, and illustrates light paths of the light emitted when the high beam and the low beam are used.

Lighting apparatus 1 according to the embodiment is a vehicle lighting apparatus used in, for example, a vehicle headlight, and projects light forward. As illustrated in FIG. 2 through FIG. 5, the main body of lighting apparatus 1 includes base 2, high beam lamp 3, and low beam lamp 4. More specifically, lighting apparatus 1 includes high beam light source module 10, low beam light source module 13, lens body 20, heat sink 30, and shield 40. Lighting apparatus 1 further includes a lighting controller (not shown in FIG. 2 through FIG. 5) that controls high beam light source module 10 and low beam light source module 13.

As illustrated in FIG. 5, high beam light source module 10 includes high beam light emitting device (first light emitting device) 11 and substrate 12 for high beam use. Low beam light source module 13 includes low beam light emitting device (second light emitting device) 14 and substrate 15 for low beam use.

As illustrated in FIG. 5, lens body 20 is disposed in front of high beam light source module 10 (high beam light emitting device 11) and low beam light source module 13 (low beam light emitting device 14). As illustrated in FIG. 4, lens body 20 includes high beam lens unit 21 and low beam lens unit 22. High beam lens unit 21 is configured of three collimating lenses—first collimating lens 21_a_, first collimating lens 21_b_, and second collimating lens 21_c_.

As illustrated in FIG. 5, heat sink 30 is configured of two heat dissipating components—first heat sink 31 thermally coupled to high beam light emitting device 11 and second heat sink 32 thermally coupled to low beam light emitting device 14.

In the embodiment, heat sink 30 and shield 40 together form base 2, and high beam light source module 10 and low beam light source module 13 are disposed on base 2. In other words, high beam light emitting device 11 and low beam light emitting device 14 are disposed on base 2.

As illustrated in FIG. 3, high beam light source module 10 and high beam lens unit 21 together form high beam lamp 3. High beam lamp 3 is an optical system for producing a high beam having a desired light distribution pattern. More specifically, high beam lamp 3 includes first high beam lamp 3_a_, first high beam lamp 3_b_, and second high beam lamp 3_c_.

As illustrated in FIG. 3, low beam light source module 13 and low beam lens unit 22 together form low beam lamp 4. Low beam lamp 4 is an optical system for producing a low beam having a desired light distribution pattern.

Note that high beam lamp 3 and low beam lamp 4 may include other optical components. High beam lamp 3 and low beam lamp 4 will be described in further detail later.

As illustrated in FIG. 3 and FIG. 4, high beam light source module 10, low beam light source module 13, lens body 20, heat sink 30, and shield 40 are arranged so as to fit in a given circular region when viewed along the Z axis, and in the embodiment, are arranged so as to fit in a ϕ70 mm region.

Hereinafter, each structural element will be described in detail.

Light Source Modules

High beam light source module 10 is an LED module for producing the high beam, and is used to illuminate an area a far distance ahead. Low beam light source module 13 is an LED module for producing the low beam, and is used to illuminate the road immediately ahead.

A plurality of high beam light emitting devices 11 (first high beam light emitting device 11_a_, first high beam light emitting device 11_b_, and second high beam light emitting device 11_c_) are mounted on substrate 12 in high beam light source module 10. In the embodiment, first high beam light emitting device 11_a_, first high beam light emitting device 11_b_, and second high beam light emitting device 11_c_ are mounted so as to correspond to first collimating lens 21_a_, first collimating lens 21_b_, and second collimating lens 21_c_, respectively. More specifically, high beam light emitting device 11 emits light that transmits through high beam lens unit 21. For example, high beam light emitting device 11 emits light when lighting apparatus 1 projects the high beam.

Low beam light emitting device 14 is mounted on substrate 15 in low beam light source module 13. More specifically, low beam light emitting device 14 emits light that transmits through low beam lens unit 22. For example, low beam light emitting device 14 emits light not only when lighting apparatus 1 projects the low beam, but when the high beam is projected as well.

High beam light source module 10 and low beam light source module 13 are, for example, white light sources, such as B-Y white LED light sources that use a blue LED chip and a yellow phosphor to emit white light. Alternatively, high beam light source module 10 and low beam light source module 13 may be white LED light sources that use an LED chip that emits red light, an LED chip that emits green light, and an LED chip that emits blue light to collectively emit white light.

Moreover, high beam light source module 10 and low beam light source module 13 may be surface mount device (SMD) modules, and alternatively may be chip on board (COB) modules.

When high beam light source module 10 and low beam light source module 13 are SMD modules, high beam light emitting device 11 and low beam light emitting device 14 are each an SMD LED device that has an LED chip (bare chip) mounted and sealed with a sealant (phosphor-containing resin) in a resin package. When high beam light source module 10 and low beam light source module 13 are COB modules, high beam light emitting device 11 and low beam light emitting device 14 are each LED chips themselves, and are directly mounted on substrate 12 and substrate 15, respectively. In this case, the LED chips mounted on substrate 12 and substrate 15 are sealed with a sealant such as a phosphor-containing resin.

Substrate 12 and substrate 15 are, for example, ceramic substrates made of, for example, alumina, resin substrates made of resin, or insulated metal substrates consisting of a metal baseplate covered by a layer of insulating material. Substrate 12 and substrate 15 have a shape in plan view corresponding to the shape of the mounting surface on heat sink 30 to which substrate 12 and substrate 15 are mounted.

High beam light source module 10 having such as structure is fixed to first heat sink 31 of heat sink 30. More specifically, substrate 12 is mounted and fixed to a predetermined mounting surface on first heat sink 31. Moreover, in the embodiment, substrate 12 is arranged standing (i.e., vertically) so that high beam light source module 10 projects light in a forward direction. In other words, the optical axis of high beam light source module 10 (high beam light emitting device 11) is parallel to the Z axis.

Low beam light source module 13 is fixed to second heat sink 32 of heat sink 30. More specifically, substrate 15 is mounted and fixed to a predetermined mounting surface on second heat sink 32. Moreover, in the embodiment, substrate 15 is arranged laying flat (i.e., horizontally) so that low beam light source module 13 projects light in an upward direction. In other words, the optical axis of low beam light source module 13 (low beam light emitting device 14) is parallel to the Y axis.

Lens Body

As illustrated in FIG. 2 through FIG. 5, high beam lens unit 21 and low beam lens unit 22 are integrally formed together to form lens body 20. For example, lens body 20 can be made by, for example, injection molding using a clear resin such as acryl, polycarbonate, or cyclic olefin. Note that high beam lens unit 21 and low beam lens unit 22 are not required to be integrally formed.

As described above, high beam lens unit 21 is disposed in front of high beam light source module 10 and configured of three collimating lenses—first collimating lens 21*a*, first collimating lens 21*b*, and second collimating lens 21*c*.

As illustrated in FIG. 6, light emitted forward by first high beam light emitting device 11*a*, first high beam light emitting device 11*b*, and second high beam light emitting device 11*c* passes through first collimating lens 21*a*, first collimating lens 21*b*, and second collimating lens 21*c* and travels forward as collimated light.

More specifically, first collimating lens 21*a*, first collimating lens 21*b*, and second collimating lens 21*c* each have a truncated cone shape whose diameter increases toward the front. The plurality of high beam light emitting devices 11 (first high beam light emitting device 11*a*, first high beam light emitting device 11*b*, and second high beam light emitting device 11*c*) are disposed in the smaller diameter regions of these truncated cones (i.e., toward the back).

With this configuration, light emitted by first high beam light emitting device 11*a*, first high beam light emitting device 11*b*, and second high beam light emitting device 11*c* is collimated by totally reflecting off the inner face of the truncated conical and curved outer wall. The collimated light then exits the front surface (planar surface) of first collimating lens 21*a*, first collimating lens 21*b*, and second collimating lens 21*c*, and travels forward.

Low beam lens unit 22 is disposed in front of low beam light source module 13. Low beam lens unit 22 is also disposed in front of shield 40. More specifically, low beam lens unit 22 is disposed so as to cover an opening formed in front of shield 40.

The lower portion of low beam lens unit 22 has the shape of a quarter slice of a sphere (one quarter of a sphere). The upper portion of low beam lens unit 22 has the shape of one quarter of a sphere, but the portions in front of the three lenses included in high beam lens unit 21 are removed.

As illustrated in FIG. 6, light emitted upward by low beam light emitting device 14 is reflected off reflector 41 of shield 40 and enters low beam lens unit 22. The optical properties of low beam lens unit 22 direct the light, and the light exits forward from the front surface (curved surface) of low beam lens unit 22.

Heat Sink

Heat sink 30 is a heat dissipating component for dissipating heat generated by high beam light source module 10 and low beam light source module 13 (to the atmosphere). Consequently, heat sink 30 is preferably made of a material with a high rate of heat transfer, such as metal. Heat sink 30 is, for example, an aluminum die cast heat sink made from composite aluminum.

As illustrated in FIG. 5, heat sink 30 is divided into first heat sink 31 and second heat sink 32. In other words, first heat sink 31 and second heat sink 32 are integrally combined to form heat sink 30. First heat sink 31 and second heat sink 32 each include a plurality of heat dissipating fins.

First heat sink 31 is a heat dissipating component for dissipating heat generated mainly by high beam light source module 10 (high beam light emitting device 11). First heat sink 31 includes a mounting surface (installation surface) for mounting high beam light source module 10.

Second heat sink 32 is a heat dissipating component for dissipating heat generated mainly by low beam light source module 13 (low beam light emitting device 14). Second heat sink 32 includes a mounting surface (installation surface) for mounting low beam light source module 13.

In the embodiment, the front end of first heat sink 31 protrudes further forward than the front end of second heat sink 32. This allows high beam light source module 10 to be disposed further forward than low beam light source module 13.

Shield

Shield 40 is for defining a predetermined cut-off line. Shield 40 defines the predetermined cut-off line by shielding a portion of the light emitted by low beam light source module 13. As illustrated in FIG. 5, shield 40 is disposed in the space between low beam lens unit 22 and heat sink 30. Shield 40 may be formed by plastics molding using a heat resistant resin, for example. Note that shield 40 may be metal instead of resin.

As illustrated in FIG. 5, in the embodiment, reflector 41 is formed on shield 40. Reflector 41 is disposed above low beam light source module 13 and reflects light emitted upward by low beam light source module 13. Reflector 41 has a curved reflective surface so as to reflect light forward at a downward sloping angle toward low beam lens unit 22. Reflector 41 is formed by giving a portion of shield 40 a mirror finish. For example, reflector 41 may be formed on shield 40 by forming a metal deposition film (for example, an aluminum deposition film) on a portion of shield 40 (heat resistant resin).

Note that reflector 41 and shield 40 may be separate components instead of being formed integrally.

Area of Illumination

Next, the area illuminated by lighting apparatus 1 according to the embodiment will be described with reference to FIG. 7 through FIG. 11.

Figure 7:
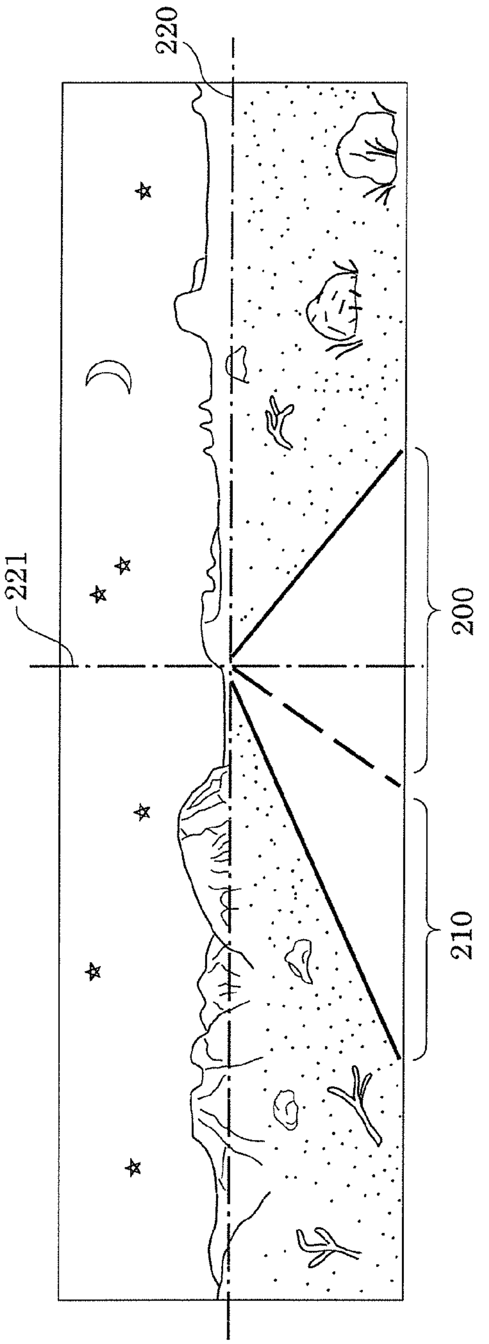
FIG. 7 illustrates a driving lane for an automobile according to an embodiment of the present disclosure and an oncoming traffic lane.

FIG. 7 illustrates the driving lane for the automobile according to the embodiment and the oncoming traffic lane.

As described above, lighting apparatus 1 according to the embodiment is used in the headlights of automobile 100. Automobile 100 is driven, for example, in driving lane 200 illustrated in FIG. 7. For example, FIG. 7 illustrates a view forward from the driver's seat of automobile 100.

In the embodiment, the lane to the right relative to the direction of travel of automobile 100 is driving lane 200 for automobile 100, and the lane to the left relative to the direction of travel of automobile 100 is oncoming traffic lane 210 (i.e., right-hand traffic), as illustrated in FIG. 7. Note that the left lane relative to the direction of travel of automobile 100 may be the driving lane for automobile 100 and the right lane relative to the direction of travel may be the oncoming traffic lane (i.e., left-hand traffic). In the case of left-hand traffic, the area illuminated by (the light distribution pattern of) the high beam and the low beam in the case of right-hand traffic may simply be laterally mirrored.

Note that in FIG. 7, the optical axis of lighting apparatus 1 (the headlight) is shown by the intersection of horizontal line 220 and vertical line 221. The height (vertical position) of horizontal line 220 is, for example, the height of lighting apparatus 1 measured from the ground. The position (horizontal position) of vertical line 221 is, for example, approximately in front (in the driving direction) of vehicle body 110. In other words, vertical line 221 is equivalent to a vertical plane passing through the optical axis of lighting apparatus 1.

Figure 8:
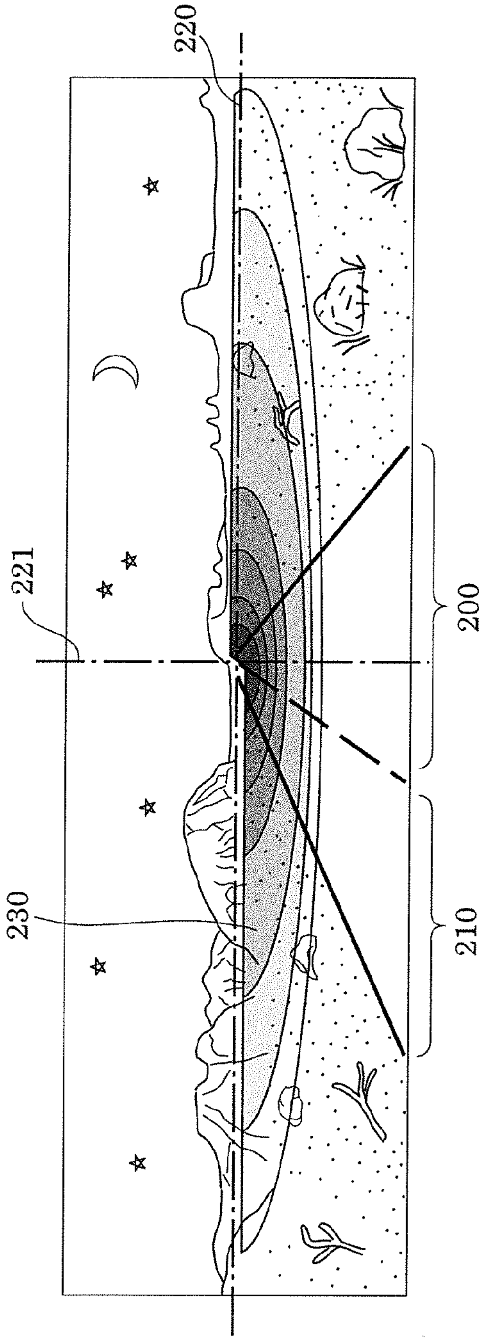
FIG. 8 illustrates an area illuminated by a lighting apparatus according to an embodiment of the present disclosure when the low beams are in use.

FIG. 8 illustrates the area illuminated by lighting apparatus 1 according to the embodiment when the low beams are in use.

Low beam area of illumination 230 illustrated in FIG. 8 is a light distribution pattern formed with lighting apparatus 1 when the low beams are in use. In other words, low beam area of illumination 230 is the area lighting apparatus 1 illuminates when the low beams are in use. Low beam area of illumination 230 is formed so as to achieve a luminous intensity at a point of measurement based on a given standard. Note that the luminous intensity of low beam area of illumination 230 is high in the vicinity of the center and gradually decreases with distance outward in FIG. 8.

More specifically, when the low beams are in use, lighting apparatus 1 illuminates the vicinity in front of automobile 100. For example, lighting apparatus 1 illuminates the side of the road in oncoming traffic lane 210 in addition to the side of the road in driving lane 200. Moreover, lighting apparatus 1 illuminates the portion of driving lane 200 far ahead that is above horizontal line 220.

Here, lighting apparatus 1 increases the luminous intensity of driving lane 200 while reducing the luminous intensity of oncoming traffic lane 210. To achieve this, low beam area of illumination 230 includes what is known as a cut-off line. More specifically, the cut-off line is what produces the uneven top line of low beam area of illumination 230.

In this way, when the low beams are being used, lighting apparatus 1 illuminates the area of driving lane 200 far ahead above horizontal line 220 in addition to the immediately surrounding area. This makes it possible to provide the driver with a more pleasant driving experience. On the other hand, the area above horizontal line 220 on the side of oncoming traffic lane 210 is not illuminated, which makes it possible to avoid unintentionally blinding oncoming drivers.

Figure 9:
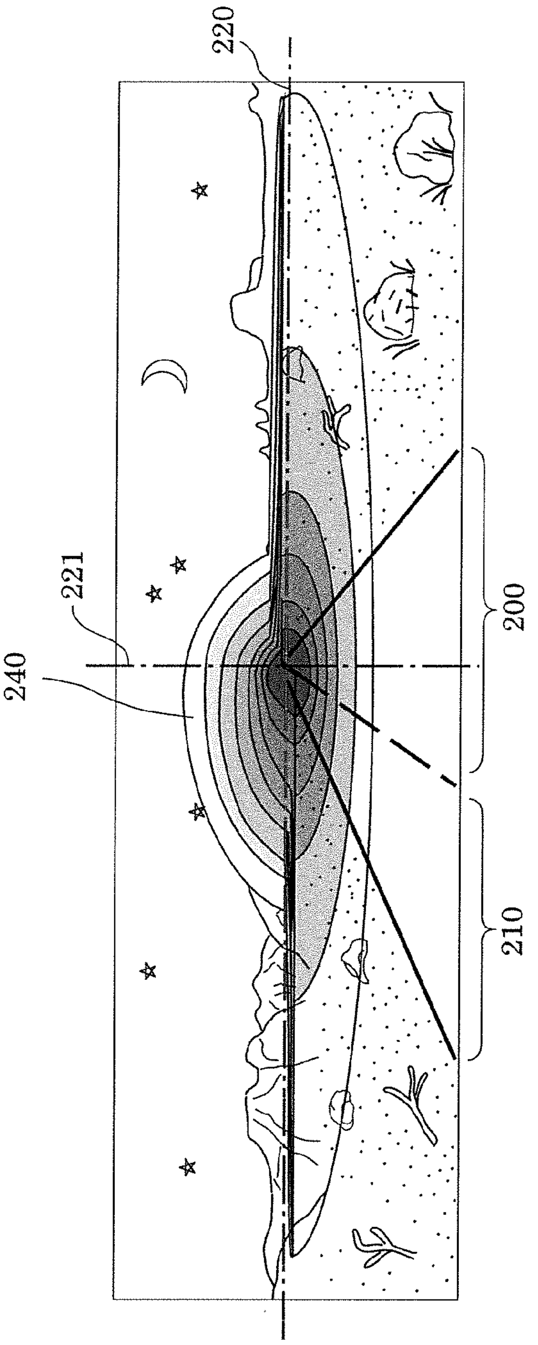
FIG. 9 illustrates an area illuminated by a lighting apparatus according to an embodiment of the present disclosure when the high beams are in use.

FIG. 9 illustrates the area illuminated by lighting apparatus 1 according to the embodiment when the high beams are in use.

High beam area of illumination 240 illustrated in FIG. 9 is a light distribution pattern formed with lighting apparatus 1 when the high beams are in use. In other words, high beam area of illumination 240 is the area lighting apparatus 1 illuminates when the high beams are in use. High beam area of illumination 240 is formed so as to achieve a luminous intensity at a point of measurement based on a given standard.

When the high beams are in use, regions above horizontal line 220 on both driving lane 200 and oncoming traffic lane 210 sides of the road are illuminated. This makes it possible for the driver to more clearly see objects in the far field including oncoming traffic lane 210 in addition to driving lane 200, and thus provide the driver with a more pleasant driving experience.

High beam area of illumination 240 illustrated in FIG. 9 is formed by overlapping three areas of illumination. More specifically, the three areas of illumination are low beam area of illumination 230 illustrated in FIG. 8, first high beam area of illumination 241 illustrated in FIG. 10, and second high beam area of illumination 242 illustrated in FIG. 11.

Figure 10:
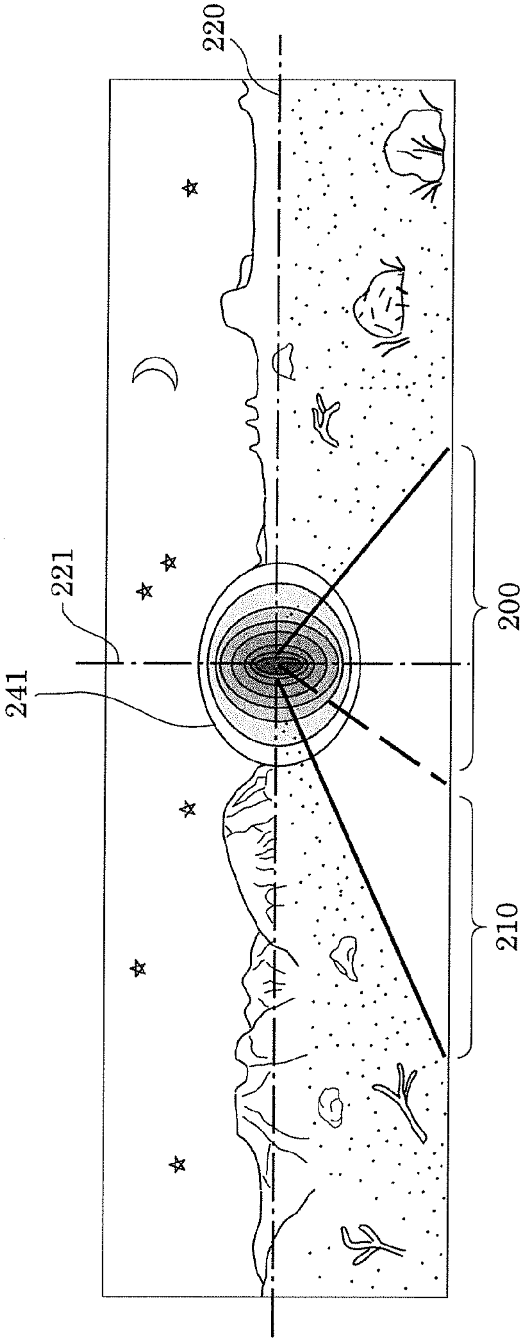
FIG. 10 illustrates an area illuminated by a first high beam lamp included in a lighting apparatus according to an embodiment of the present disclosure.
Figure 11:
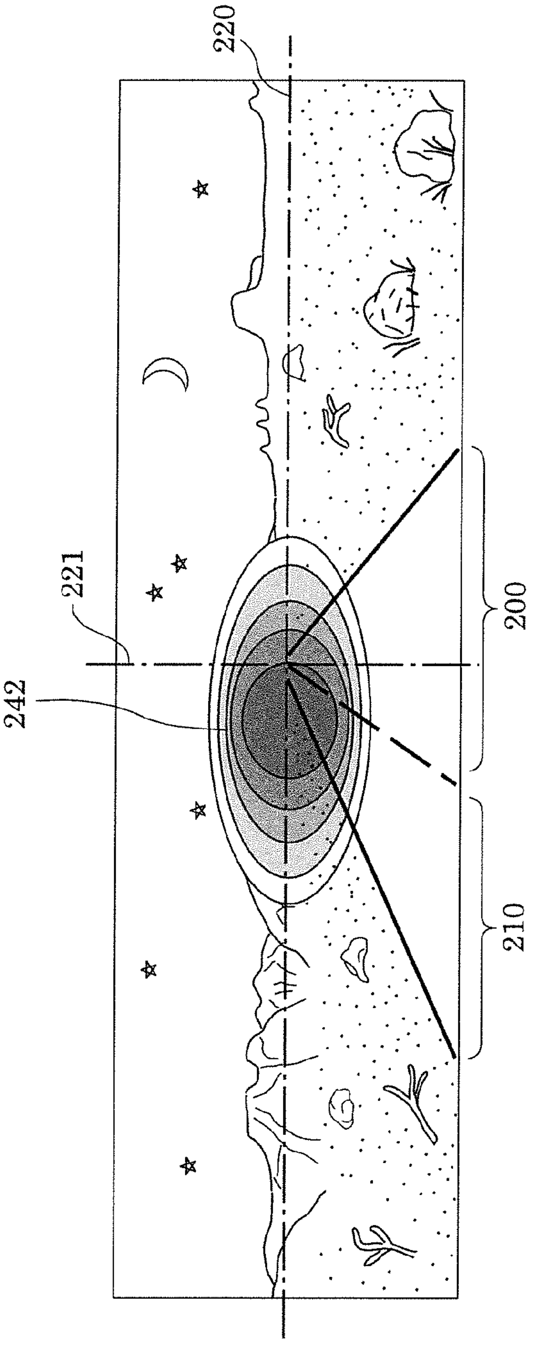
FIG. 11 illustrates an area illuminated by a second high beam lamp included in a lighting apparatus according to an embodiment of the present disclosure.

Note that FIG. 10 illustrates the area illuminated by first high beam lamp 3*a* and first high beam lamp 3*b* included in lighting apparatus 1 according to the embodiment. FIG. 11 illustrates the area illuminated by second high beam lamp 3*c* included in lighting apparatus 1 according to the embodiment.

Hereinafter, high beam lamp 3, first high beam area of illumination 241, and second high beam area of illumination 242 will be described with reference to FIG. 10 and FIG. 11 while also referring back to FIG. 2 through FIG. 5.

First High Beam Lamp

First high beam lamp 3*a* includes first high beam light emitting device 11*a* and first collimating lens 21*a*, as illustrated in FIG. 3. Similarly, first high beam lamp 3*b* includes first high beam light emitting device 11*b* and first collimating lens 21*b*, as illustrated in FIG. 3.

First collimating lens 21*a* and first collimating lens 21*b* are substantially circular in front view, as illustrated in FIG.

3. First collimating lens 21*a* and first collimating lens 21*b* are designed so as to have optical axes that align with the traveling direction of automobile 100 (Z axis) when lighting apparatus 1 is attached to automobile 100.

The area illuminated by first high beam lamp 3*a* and first high beam lamp 3*b* is first high beam area of illumination 241 illustrated in FIG. 10. Note that first high beam lamp 3*a* and first high beam lamp 3*b* illuminate approximately the same area. In other words, first high beam lamp 3*a* and first high beam lamp 3*b* both illuminate first high beam area of illumination 241.

The center of the area illuminated by first high beam lamp 3*a* is, for example, the centroid of the area, and the center of the area illuminated by first high beam lamp 3*b* is, for example, the centroid of the area. More specifically, the center of the area illuminated by first high beam lamp 3*a* and first high beam lamp 3*b* is the center (centroid) of first high beam area of illumination 241.

For example, the center of first high beam area of illumination 241 is located in the vicinity of where driving lane 200 and horizontal line 220 intersect in the distance, as illustrated in FIG. 10. For example, the center of first high beam area of illumination 241 is located at the intersection of horizontal line 220 and vertical line 221.

In this way, since first high beam lamp 3*a* and first high beam lamp 3*b* illuminate a narrow area of an extension of driving lane 200, power consumption is reduced by reducing the amount of light output while still being able to illuminate the near portion of driving lane 200 to a sufficient brightness.

Second High Beam Lamp

Second high beam lamp 3*c* includes second high beam light emitting device 11*c* and second collimating lens 21*c*, as illustrated in FIG. 3. The area illuminated by second high beam lamp 3*c* is second high beam area of illumination 242 illustrated in FIG. 11. As can be seen by comparing FIG. 10 and FIG. 11, first high beam area of illumination 241 and second high beam area of illumination 242 are different from each other.

More specifically, the optical axis of second collimating lens 21*c* is oblique to the optical axes of first collimating lens 21*a* and first collimating lens 21*b*, as illustrated in FIG. 4. For example, the optical axis of second collimating lens 21*c* intersects the optical axis of first collimating lens 21*a* at an angle greater than 0 degrees and less than or equal to 10 degrees. In other words, second collimating lens 21*c* is oriented at an angle such that its optical axis points toward oncoming traffic lane 210.

This makes it possible to horizontally space apart the center of the area illuminated by second high beam lamp 3*c* and the center of the area illuminated by first high beam lamp 3*a* and first high beam lamp 3*b*. In other words, as can be seen by comparing FIG. 10 and FIG. 11, the center of second high beam area of illumination 242 and the center of first high beam area of illumination 241 are horizontally spaced apart from each other.

More specifically, the center of second high beam area of illumination 242 is situated around horizontal line 220 to the side of oncoming traffic lane 210 (the side away from driving lane 200). In other words, the center of second high beam area of illumination 242 is located a given distance away from the intersection of vertical line 221 and horizontal line 220 in a direction toward oncoming traffic lane 210.

Second collimating lens 21*c* is substantially elliptical in front view. In other words, second collimating lens 21*c* has a different shape than first collimating lens 21*a*. More specifically, the shape of the reflective surface (i.e., the side surface) of second collimating lens 21*c* is designed to be different than the shape of first collimating lens 21*a*.

Note that, as illustrated in FIG. 3, first collimating lens 21*a* and second collimating lens 21*c* are substantially circular in front view, but first collimating lens 21*a* is closer to a true circle than second collimating lens 21*c*.

As a result, second high beam area of illumination 242 has a horizontal width that is greater than the horizontal width of first high beam area of illumination 241. More specifically, second high beam area of illumination 242 has a maximum horizontal width that is greater than the maximum horizontal width of first high beam area of illumination 241. As illustrated in FIG. 10 and FIG. 11, second high beam area of illumination 242 is substantially elliptical, while first high beam area of illumination 241 is substantially circular.

Note that, for example, first high beam area of illumination 241 may be included in second high beam area of illumination 242. In other words, second high beam area of illumination 242 may be larger than first high beam area of illumination 241. Moreover, first high beam area of illumination 241 may have a vertical width (i.e., height) that is greater than the height of second high beam area of illumination 242.

In this way, even though power consumption is reduced by reducing the amount of light output, since second high beam lamp 3*c* illuminates a horizontally elongated area (a narrow area) including driving lane 200 and oncoming traffic lane 210, it is still possible to illuminate, to a sufficient brightness, the shoulder of the road adjacent to driving lane 200 as well as the area next to the shoulder, and the shoulder of the road adjacent to oncoming traffic lane 210 as well as the area next to the shoulder.

Moreover, this sort of second high beam lamp 3*c* can be achieved by simply angling the optical axis of the lens and making the shape of the lens different from the others.

High Beam Lamp Arrangement

As illustrated in FIG. 3 and FIG. 4, first high beam lamp 3*a* and first high beam lamp 3*b* are horizontally offset from each other. Moreover, as illustrated in FIG. 3, first high beam lamp 3*a* and first high beam lamp 3*b* are vertically offset from each other.

More specifically, first high beam light emitting device 11*a* and first high beam light emitting device 11*b* are spaced apart from each other both horizontally and vertically. First collimating lens 21*a* and first collimating lens 21*b* are also offset from each other both horizontally and vertically.

This allows for the horizontal width of the space occupied by first high beam lamp 3*a* and first high beam lamp 3*b* to be reduced to less than when aligned on a single horizontal line. This makes it possible to reduce the overall size of lighting apparatus 1.

First high beam lamp 3*b* and second high beam lamp 3*c* are also offset from each other both horizontally and vertically. More specifically, first high beam light emitting device 11*b* and second high beam light emitting device 11*c* are spaced apart from each other both horizontally and vertically. First collimating lens 21*b* and second collimating lens 21*c* are also offset from each other both horizontally and vertically.

This makes it possible to reduce the overall size of lighting apparatus 1.

Note that when viewed from the front, first high beam lamp 3*a*, first high beam lamp 3*b*, and second high beam lamp 3*c* are disposed in the listed order from right to left. In other words, second high beam lamp 3*c* is disposed on the side opposite oncoming traffic lane 210, but the arrangement of the high beam lamp is not limited to this example. Second high beam lamp 3*c* may be disposed in the middle position and, alternatively, may be disposed on the side nearest oncoming traffic lane 210.

Moreover, the number of first high beam lamps included in lighting apparatus 1 may be one, and the number of second high beam lamps included in lighting apparatus 1 may be more than one.

On/Off Control

Figure 12:
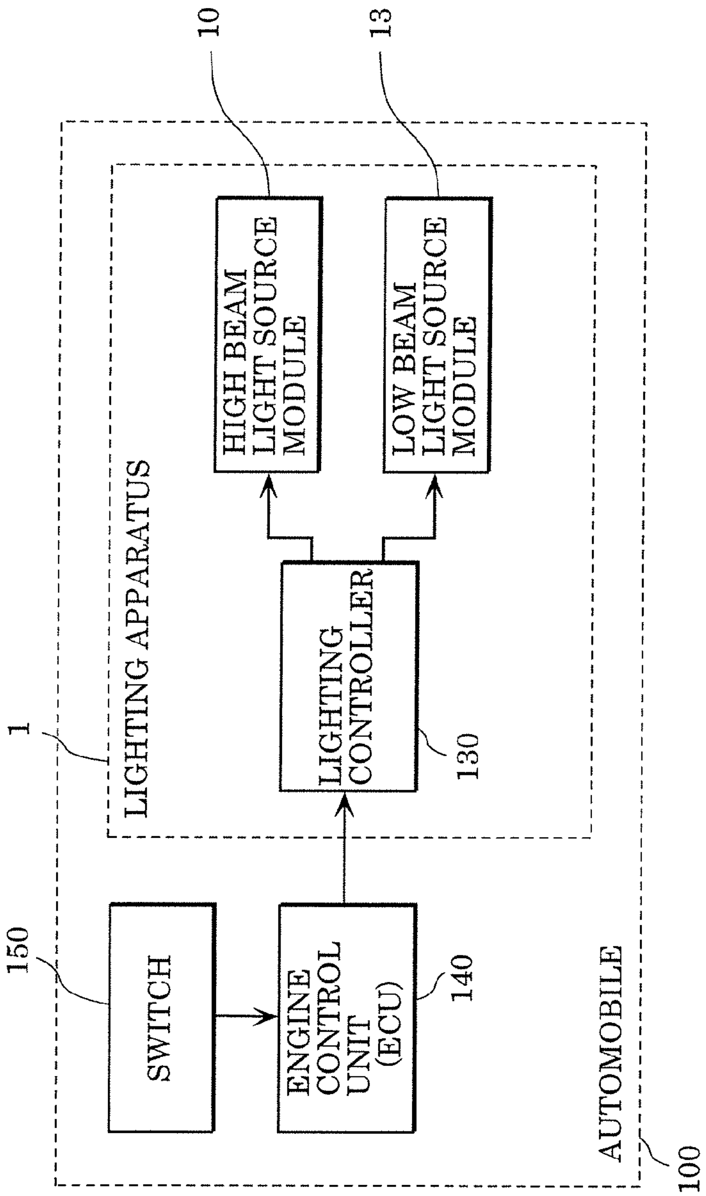
FIG. 12 is a block diagram illustrating a configuration relating to lighting functions of an automobile according to an embodiment of the present disclosure.

FIG. 12 is a block diagram illustrating a configuration relating to lighting functions of automobile 100 according to the embodiment. In other words, FIG. 12 is an illustration of when lighting apparatus 1 according to the embodiment is installed in automobile 100.

As illustrated in FIG. 12, automobile 100 includes lighting apparatus 1, engine control unit 140, and switch 150. Lighting apparatus 1 includes a main body (high beam light source module 10 and low beam light source module 13) and lighting controller 130.

Lighting controller 130 turns on first high beam light emitting device 11*a*, first high beam light emitting device 11*b*, second high beam light emitting device 11*c*, and low beam light emitting device 14 when the high beams are turned on. In other words, lighting controller 130 turns on all light emitting devices when the high beams are turned on. When the low beams are turned on, however, lighting controller 130 only turns on low beam light emitting device 14.

Engine control unit (ECU) 140 controls the engine of automobile 100. Engine control unit 140 is, for example, a microcontroller. Lighting controller 130 and switch 150 are connected to engine control unit 140. Engine control unit 140 transmits an instruction input from switch 150 to lighting controller 130.

Switch 150 switches lighting apparatus 1 on and off. More specifically, switch 150 switches the low beams on and off and switches the high beams on and off. Even more specifically, switch 150 switches each of low beam light emitting device 14, first high beam light emitting device 11*a*, first high beam light emitting device 11*b*, and second high beam light emitting device 11*c* on and off.

For example, when driving at night and an oncoming vehicle is present, the driver of automobile 100 operates switch 150 to cause lighting apparatus 1 to project the low beam. More specifically, lighting controller 130 turns on only low beam light emitting device 14 to achieve low beam area of illumination 230 illustrated in FIG. 8.

Moreover, when driving at night and an oncoming vehicle is not present, the driver of automobile 100 operates switch 150 to cause lighting apparatus 1 to project the high beam. More specifically, lighting controller 130 turns on low beam light emitting device 14, first high beam light emitting device 11*a*, first high beam light emitting device 11*b*, and second high beam light emitting device 11*c* to achieve high beam area of illumination 240 illustrated in FIG. 9. Here, since first high beam lamp 3*a*, first high beam lamp 3*b*, second high beam lamp 3*c*, and low beam lamp 4 each illuminate a narrow area, power consumption is reduced.

With, for example, a conventional lighting apparatus, when driving at night and an oncoming vehicle is present, the low beam light emitting device is turned on, and when driving at night and an oncoming vehicle is not present, the high beam light emitting device is turned on. In other words, either the low beam light emitting device or the high beam light emitting device is exclusively turned on depending on the presence of an oncoming vehicle.

In this case, the high beam light emitting device must achieve an extremely high illuminance, which makes it impossible to reduce power consumption.

For example, when the area that is illuminated for high beam use is achieved with one light emitting device or a plurality of light emitting devices that illuminate the same area, the luminous intensity must be increased excessively. For example, when the light emitting device is turned on so as to achieve a luminous intensity at a measurement point A stipulated in a given standard, the luminous intensity at a different measurement point B may be enough to fulfill the luminous intensity required by the standard. In other words, it is possible to fulfill the luminous intensity required by the standard even if the luminous intensity at measurement point B is reduced. In other words, projecting light of an excessive luminous intensity at measurement point B is an inefficient use of power.

In contrast, with lighting apparatus 1 according to the embodiment, the center of the area illuminated by first high beam lamp 3*a* and the center of the area illuminated by second high beam lamp 3*c* are horizontally spaced apart from each other. In other words, first high beam lamp 3*a* and second high beam lamp 3*c* illuminate different, overlapping areas such that one area supplements the other. For example, by having one of first high beam lamp 3*a* and second high beam lamp 3*c* illuminate a region including measurement point A and the other of first high beam lamp 3*a* and second high beam lamp 3*c* illuminate a region including measurement point B, first high beam lamp 3*a* and second high beam lamp 3*c* can achieve a luminous intensity necessary for each area. This makes it possible to reduce wasteful consumption of power and thus reduce power consumption while maintaining luminous intensity. In other words, compared to the example where the area of illumination is formed by either exclusively turning on the low beam light emitting device or exclusively turning on the high beam light emitting device, the amount of luminance produced by each lighting element and the amount of power consumed is reduced.

First Light Restrictor

As illustrated in FIG. 2, FIG. 4, and FIG. 5, lighting apparatus 1 according to the embodiment includes first light restrictor 50 and second light restrictor 60.

First light restrictor 50 restricts light emitted by high beam light emitting device 11 from traveling toward low beam light emitting device 14. First light restrictor 50 is disposed in front of high beam light emitting device 11 and, in front view, between low beam light emitting device 14 and high beam light emitting device 11. More specifically, first light restrictor 50 restricts light emitted by high beam light emitting device 11 from traveling downward, as high beam light emitting device 11 is disposed above low beam light emitting device 14, as illustrated in FIG. 5.

Furthermore, first light restrictor 50 is a portion of the outer surface of lens body 20. For example, first light restrictor 50 is a portion of the top surface of low beam lens unit 22 illustrated in FIG. 2. As described above, low beam lens unit 22 is shaped such that, among the top quarter slice, the portions in front of first collimating lens 21*a*, first collimating lens 21*b*, and second collimating lens 21*c* are removed. In other words, three concave sections (recesses) are formed in the top portion of low beam lens unit 22. The surfaces of the three concave sections correspond to first light restrictor 50.

More specifically, first light restrictor 50 includes reflective surface 50*a*, reflective surface 50*b*, and reflective surface 50*c*, as illustrated in FIG. 2.

Reflective surface 50*a* is a curved surface having a curvature that corresponds to a portion of the profile of the front surface of first collimating lens 21*a*. The direction in which reflective surface 50*a* curves is orthogonal to the direction of light emission (the optical axis of the lens). For example, since the front surface of first collimating lens 21*a* is substantially circular, the curved surface is equivalent to a portion of a side surface of a substantially cylindrical shape having an axis parallel to the direction of light emission. Consequently, as illustrated in FIG. 3, in a front view of lighting apparatus 1, reflective surface 50*b* has a substantially circular arc shape (in a cross section).

Reflective surface 50*b* is a curved surface having a curvature that corresponds to a portion of the profile of the front surface of first collimating lens 21*b*. In the embodiment, first collimating lens 21*b* has substantially the same shape as first collimating lens 21*a*. Accordingly, reflective surface 50*b* has a shape similar to the shape of reflective surface 50*a*.

Note that as illustrated in FIG. 3, the sizes of reflective surface 50*a* and reflective surface 50*b* depend on the arrangement of first collimating lens 21*a*, first collimating lens 21*b*, and second collimating lens 21*c*. For example, as illustrated in FIG. 3, first collimating lens 21*b* is disposed higher than first collimating lens 21*a* and partially overlaps first collimating lens 21*a*. Consequently, a portion of the part of low beam lens unit 22 that corresponds to the bottom of first collimating lens 21*b* is included in the traveling direction of light emitted from first collimating lens 21*a*. Thus, as illustrated in FIG. 2 through FIG. 4, as a result of removing a portion of the quarter so as not to obstruct the path of light emitted from first collimating lens 21*a*, reflective surface 50*b* is smaller than reflective surface 50*a*.

Reflective surface 50*c* is a curved surface having a curvature that corresponds to a portion of the profile of the front surface of second collimating lens 21*c*. The direction in which reflective surface 50*c* curves is orthogonal to the direction of light emission (the optical axis of the lens). More specifically, the direction in which reflective surface 50*c* curves is orthogonal to the optical axis of second collimating lens 21*c*. Note that as described above, the optical axis of second collimating lens 21*c* is only slightly different from the optical axis of first collimating lenses 21*a* and 21*b*, so the direction in which reflective surface 50*c* curves may be orthogonal to the optical axis of first collimating lenses 21*a* and 21*b*.

For example, since the front surface of second collimating lens 21*c* is substantially elliptical, the curved surface is equivalent to a portion of a side surface of a substantially elliptical cylindrical shape having an axis parallel to the direction of light emission. Alternatively, since the front surface of second collimating lens 21*c* is close being circular in shape, the curved surface may be equivalent to a portion of a side surface of a substantially cylindrical shape.

Note that reflective surface 50*a*, reflective surface 50*b*, and reflective surface 50*c* may reflect light spectrally and, alternatively, may reflect light diffusely. Moreover, reflective surface 50*a*, reflective surface 50*b*, and reflective surface 50*c* may totally reflect incident light and, alternatively, may partially reflect incident light.

When reflective surface 50*a*, reflective surface 50*b*, and reflective surface 50*c* are to reflect light spectrally, reflective surface 50*a*, reflective surface 50*b*, and reflective surface 50*c* need not be treated to have a mirror surface, for example. In the embodiment, light emitted downward from high beam lens unit 21 (i.e., light that has “leaked”; hereinafter also referred to as “leak light”) is denoted as traveling downward, but is actually substantially parallel to the optical axis of high beam lens unit 21. In other words, leak light is incident on reflective surface 50*a*, reflective surface 50*b*, and reflective surface 50*c* at shallow angles, meaning total reflection of light can easily be achieved without having to treat reflective surface 50*a*, reflective surface 50*b*, and reflective surface 50*c*. Note that reflective surface 50*a*, reflective surface 50*b*, and reflective surface 50*c* may be given a mirror finish by forming a metal deposition film, for example.

When reflective surface 50*a*, reflective surface 50*b*, and reflective surface 50*c* are to reflect light diffusely, reflective surface 50*a*, reflective surface 50*b*, and reflective surface 50*c* may be, for example, roughened, colored white, or treated with a knurling process to facilitate diffuse reflection of light.

As illustrated in FIG. 5, in the embodiment, the back surface of low beam lens unit 22 and the front surface of high beam lens unit 21 (in other words, the front surfaces of first collimating lens 21*a*, first collimating lens 21*b*, and second collimating lens 21*c*) are substantially flush.

This makes it possible to restrict light emitted from high beam lens unit 21 from entering low beam lens unit 22 through the back surface. In other words, light emitted downward from high beam lens unit 21 (leak light) is reflected off the top surface of low beam lens unit 22 (in other words, off first light restrictor 50) and thus restricted from traveling downward.

Second Light Restrictor

Second light restrictor 60 restricts light emitted by low beam light emitting device 14 from traveling toward high beam light emitting device 11. Second light restrictor 60 is disposed in front of low beam light emitting device 14 and, in front view, between low beam light emitting device 14 and high beam light emitting device 11. More specifically, second light restrictor 60 restricts light emitted by low beam light emitting device 14 from traveling upward, as high beam light emitting device 11 is disposed above low beam light emitting device 14, as illustrated in FIG. 5.

More specifically, second light restrictor 60 is a portion of the inner surface of shield 40. As illustrated in FIG. 6, shield 40 has a hollow space through which light emitted by low beam light emitting device 14 passes. Second light restrictor 60 is a portion of a surface defining this hollow space (in other words, a portion of the inner surface of shield 40). For example, the portion of the inner surface of shield 40 between low beam light emitting device 14 and high beam lamp 3 corresponds to second light restrictor 60.

Similar to first light restrictor 50, second light restrictor 60 is, for example, a reflective surface. More specifically, second light restrictor 60 reflects incident light specularly or diffusely. Similar to reflective surface 50*a*, reflective surface 50*b*, and reflective surface 50*c*, the inner surface of shield 40 is, for example, treated to have a mirror surface, treated to have a roughened surface, colored white, or treated with a knurling process to form second light restrictor 60. Alternatively, second light restrictor 60 may simply be a portion of the inner surface of shield 40, as-is. In other words, the inner surface of shield 40 need not be treated.

Note that second light restrictor 60 may be a light absorbing surface that absorbs incident light. The light absorbing surface may be formed by coloring the inner surface of shield 40 black. Alternatively, shield 40 may be formed from a black material by, for example, plastics forming shield 40 using a black pigment or paint to give second light restrictor 60 a light absorbing surface.

SUMMARY

Lighting apparatus 1 according to the embodiment is for vehicle use and projects light forward, and includes: base 2; low beam light emitting device 14 disposed on base 2; high beam light emitting device 11 disposed on base 2; lens body 20 disposed in front of low beam light emitting device 14 and high beam light emitting device 11; and first light restrictor 50 disposed in front of high beam light emitting device 11, first light restrictor 50 restricting light emitted by high beam light emitting device 11 from traveling downward.

With this, since the light emitted by high beam light emitting device 11 is restricted from traveling downward, the light emitted by high beam light emitting device 11 illuminates a predetermined area intended to be illuminated. In other words, light leaking from high beam light emitting device 11 can be reduced, which means power can be efficiently used to illuminate a predetermined area intended to be illuminated. Accordingly, power consumption can be reduced.

Moreover, for example, first light restrictor 50 is a reflective surface that reflects light and is a portion of an outer surface of base 2.

This makes it possible to reduce the overall size of lighting apparatus 1 since a portion of the outer surface of base 2 is used as the reflective surface. Moreover, this configuration makes it possible to use fewer parts than when first light restrictor 50 is included as a separate component.

Moreover, for example, lens body 20 includes: low beam lens unit 22 disposed in front of low beam light emitting device 14; and high beam lens unit 21 (collimating lens) disposed in front of high beam light emitting device 11.

With this, the light emitted from low beam light emitting device 14 can be projected in a desired direction as a low beam, and the light emitted from high beam light emitting device 11 can be projected in a desired direction as a high beam. Accordingly, wasteful consumption of power can be reduced to reduce overall power consumption.

Moreover, for example, first light restrictor 50 is a portion of an outer surface of low beam lens unit 22.

This makes it possible to reduce the overall size of lighting apparatus 1 since a portion of the outer surface of low beam lens unit 22 is used as the reflective surface. Moreover, this configuration makes it possible to use fewer parts than when first light restrictor 50 is included as a separate component.

Moreover, for example, low beam lens unit 22 is a rear surface, high beam lens unit 21 is a front surface, and the front surface and the rear surface is substantially flush.

This makes it possible to restrict light emitted from high beam lens unit 21 from entering low beam lens unit 22 through the back surface. In other words, light emitted downward from high beam lens unit 21 (leak light) is reflected off the top surface of low beam lens unit 22 and thus restricted from traveling downward.

Moreover, for example, low beam lens unit 22 and high beam lens unit 21 are integrally formed.

With this, since lens body 20 can be molded by, for example, injection molding, manufacturing of lighting apparatus 1 can be simplified.

Moreover, for example, lighting apparatus 1 further includes second light restrictor 60 disposed in front of low beam light emitting device 14, second light restrictor 60 restricting light emitted by low beam light emitting device 14 from traveling upward.

With this, since the light emitted by low beam light emitting device 14 is restricted from traveling upward, the light emitted by low beam light emitting device 14 illuminates a predetermined area intended to be illuminated. In other words, light leaking from low beam light emitting device 14 can be reduced, which means power can be efficiently used to illuminate a predetermined area intended to be illuminated. Accordingly, power consumption can be reduced.

Moreover, for example, base 2 includes: heat sink 30; and shield 40 that defines a predetermined low beam cut-off line, and second light restrictor 60 is a portion of an inner surface of shield 40.

This makes it possible to reduce the overall size of lighting apparatus 1 since a portion of the inner surface of shield 40 is used as second light restrictor 60. Moreover, this configuration makes it possible to use fewer parts than when second light restrictor 60 is included as a separate component.

Moreover, for example, the automobile according to the embodiment includes: lighting apparatus 1, vehicle body 110 including lighting apparatus 1 in a front portion; lighting controller 130 configured to turn on low beam light emitting device 14 and high beam light emitting device 11 when the high beams are turned on; and engine control unit 140 connected to lighting controller 130.

This makes it possible to improve fuel efficiency and, for example, extend the distance capable of being driven, by reducing power consumption.

Variations

Figure 14:
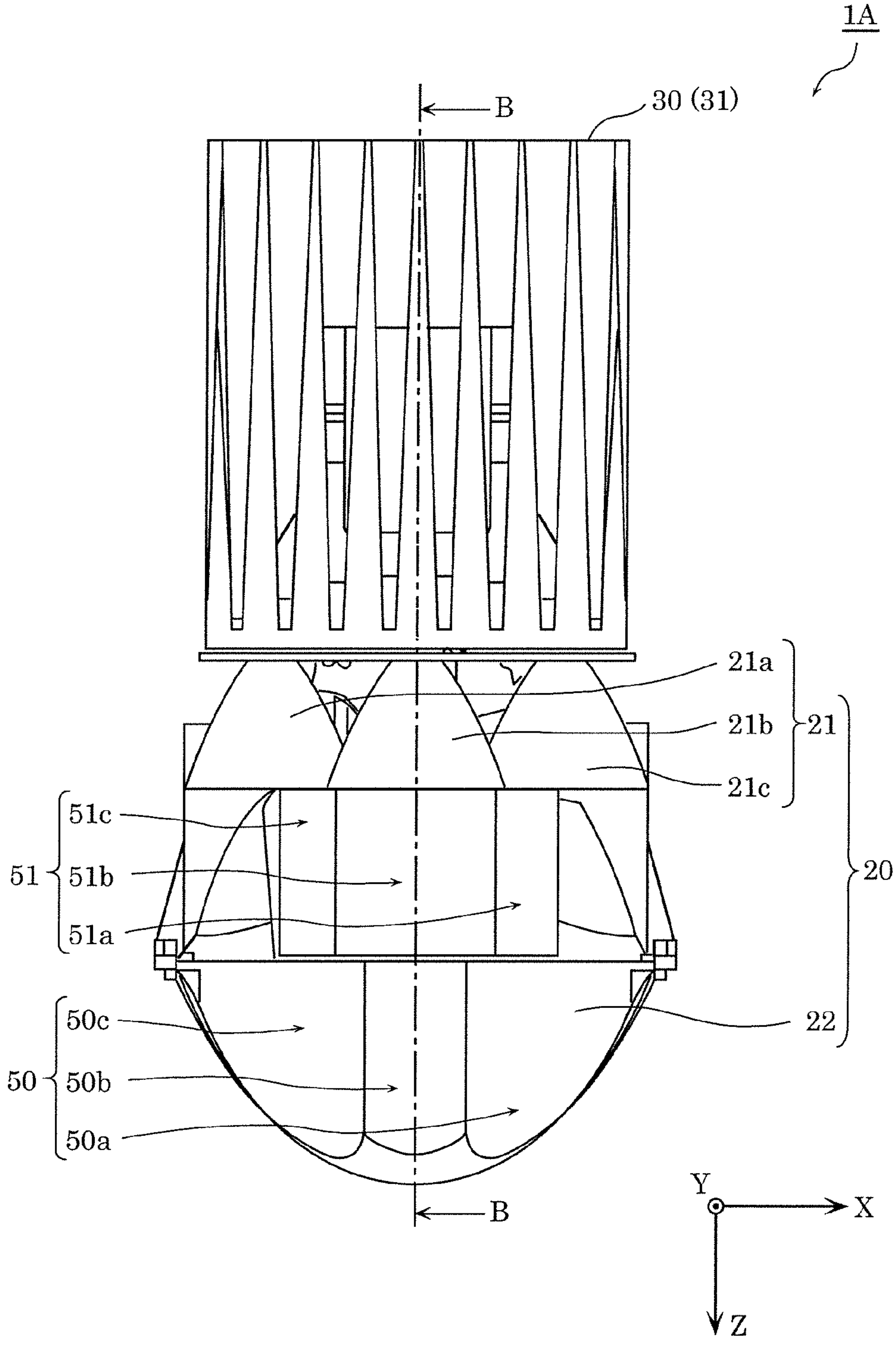
FIG. 14 is a top view of a lighting apparatus according to a variation of an embodiment of the present disclosure.
Figure 15:
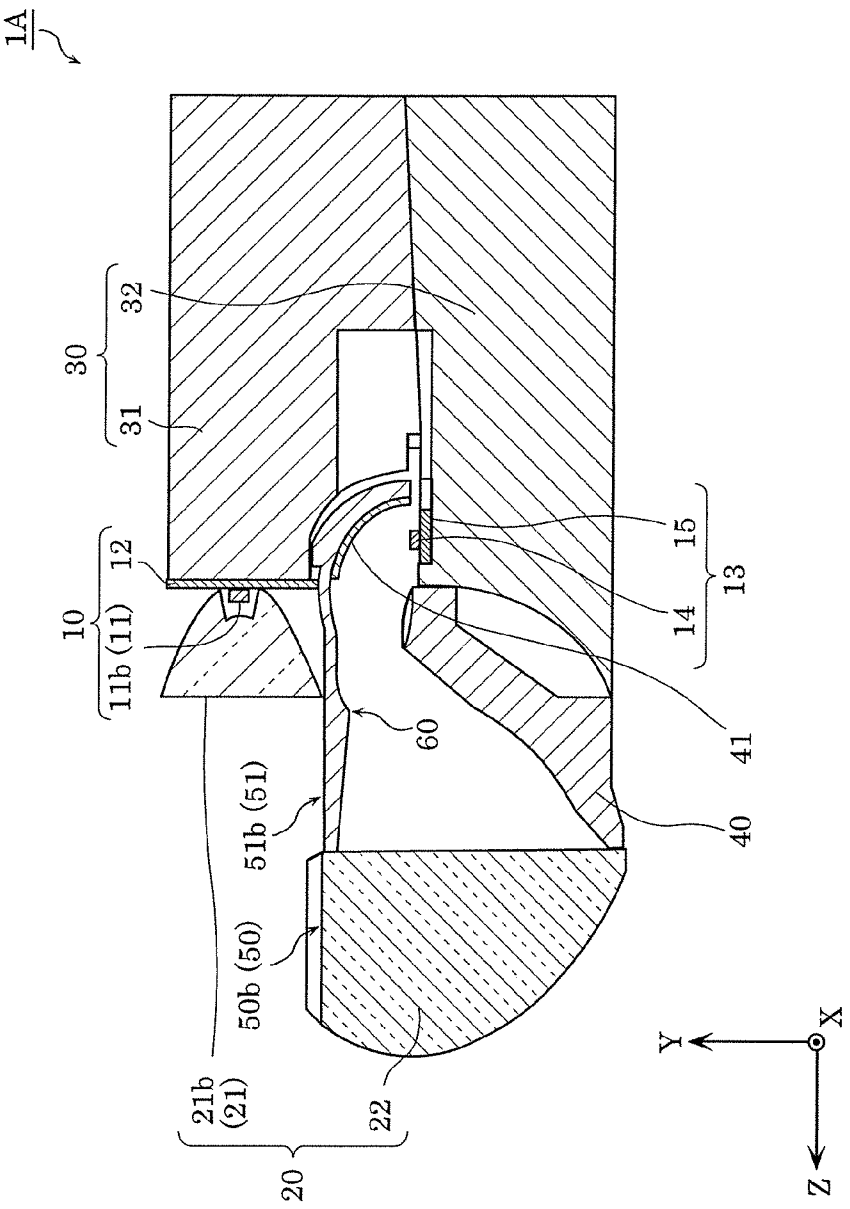
FIG. 15 is a cross sectional view of a lighting apparatus according to a variation of an embodiment of the present disclosure taken at line B-B in FIG. 14.

Hereinafter, lighting apparatus 1A according to a variation of the above embodiment will be described with reference to FIG. 13 through FIG. 15. In the above embodiment, first light restrictor 50 is exemplified as being a portion of the outer surface of lens body 20, but the present invention is not limited to this example. The first light restrictor according to this variation is only required to be a portion of the outer surface of base 2. For example, the first light restrictor may be a portion of the outer surface of shield 40.

Figure 13:
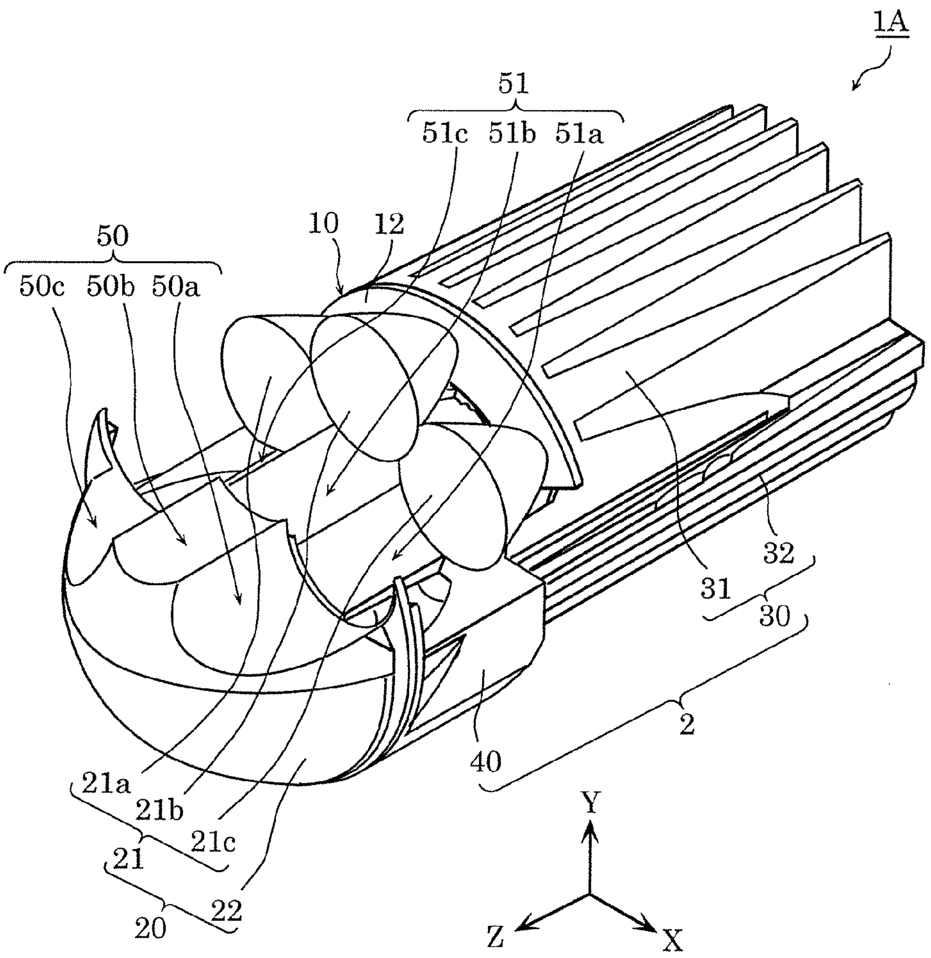
FIG. 13 is a perspective view of a lighting apparatus according to a variation of an embodiment of the present disclosure.
Figure 16:
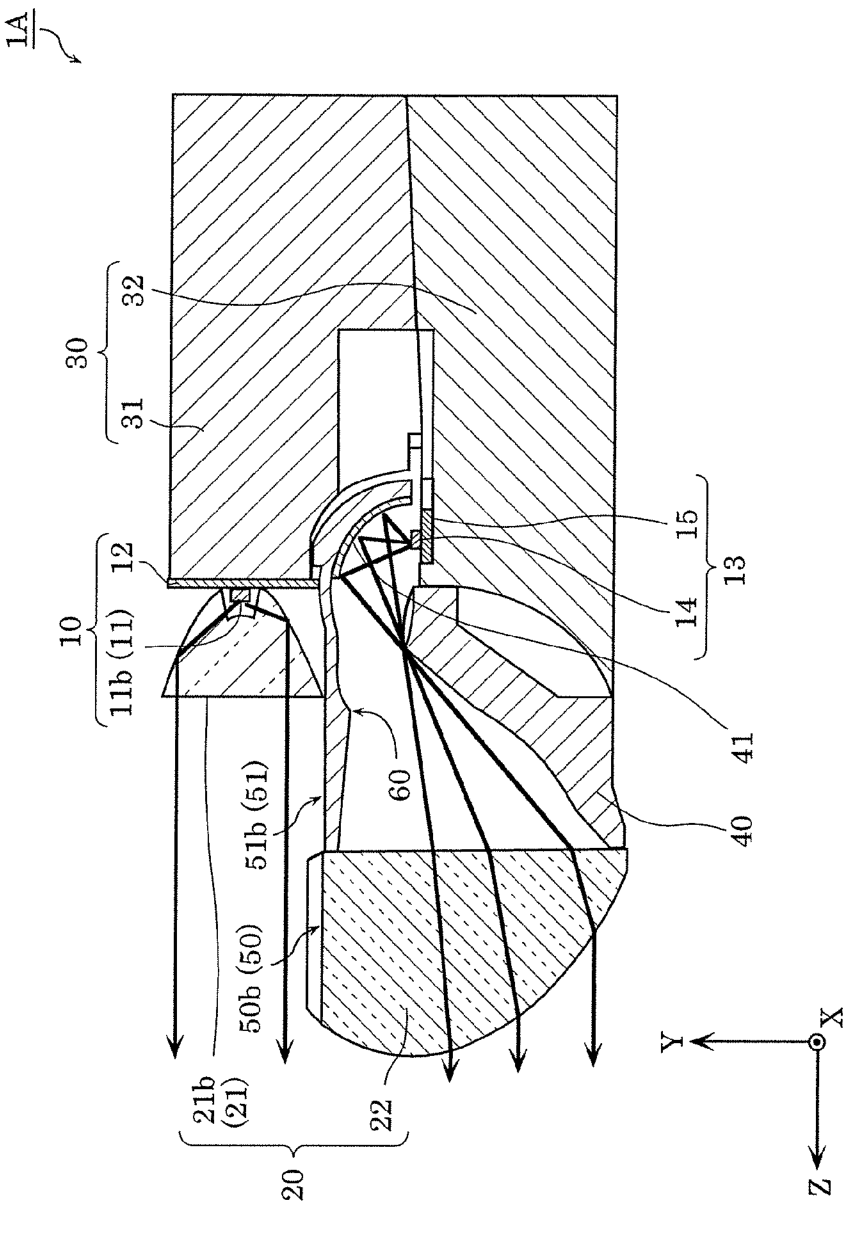
FIG. 16 is a cross sectional view of a lighting apparatus according to a variation of an embodiment of the present disclosure taken at line B-B in FIG. 14, illustrating paths of light emitted when the high beams and low beams are in use.

FIG. 13 is a perspective view of the lighting apparatus according to a variation of an embodiment of the present invention. FIG. 14 is a top view of the same lighting apparatus. FIG. 15 is a cross sectional view of the same lighting apparatus taken at line B-B illustrated in FIG. 14. Note that since a front view depiction of the lighting apparatus according to a variation of an embodiment of the present invention is substantially the same as FIG. 3, description thereof is herein omitted. FIG. 16 is a cross sectional view of the same lighting apparatus taken at line B-B illustrated in FIG. 14, illustrating paths of light emitted when the high beams and low beams are in use.

High beam lamp 3 in lighting apparatus 1A according to this variation is disposed in a different location than in lighting apparatus 1 according to the embodiment described above. More specifically, in lighting apparatus 1 according to the embodiment described above, the front surface of high beam lens unit 21 (first collimating lens 21*a*, first collimating lens 21*b*, and second collimating lens 21*c*) and the back surface of low beam lens unit 22 are arranged so as to be substantially flush. In contrast, in lighting apparatus 1A according to this variation, the front surface of high beam lens unit 21 is disposed further back than the back surface of low beam lens unit 22.

Lighting apparatus 1A according to this variation further includes first light restrictor 51. Similar to first light restrictor 50, first light restrictor 51 restricts light emitted by high beam light emitting device 11 from traveling toward low beam light emitting device 14.

As illustrated in FIG. 16, light emitted from high beam lens unit 21 passes over the top of both shield 40 and low beam lens unit 22, and continues traveling forward. This is cause for concern that light travelling downward from high beam lens unit 21 (leak light) may be incident on shield 40. For example, if first light restrictor 51 is omitted, there is cause for concern that the light may be incident on low beam lens unit 22 and ultimately emitted as low beam light.

In contrast, since lighting apparatus 1A according to this variation includes first light restrictor 51, light emitted from high beam lens unit 21 can be restricted from striking shield 40 with lighting apparatus 1A.

More specifically, first light restrictor 51 includes reflective surface 51*a*, reflective surface 51*b*, and reflective surface 51*c*, as illustrated in FIG. 13. Similar to reflective surface 50*a*, reflective surface 50*b*, and reflective surface 50*c* of first light restrictor 50, reflective surface 51*a*, reflective surface 51*b*, and reflective surface 51*c* are each a curved surface having a curvature that corresponds to a portion of the profile of the corresponding collimating lens. Moreover, reflective surface 51*a*, reflective surface 51*b*, and reflective surface 51*c* are each a portion of the outer surface of shield 40. More specifically, reflective surface 51*a*, reflective surface 51*b*, and reflective surface 51*c* are the surfaces of shield 40 on the opposite side from second light restrictor 60, as illustrated in FIG. 15.

As described above, lighting apparatus 1A according to this variation includes base 2, heat sink 30, and shield 40 that defines a predetermined low beam cut-off line, and first light restrictor 51 is a portion of the outer surface of shield 40.

With this, since the light emitted by high beam light emitting device 11 is restricted from traveling downward, the light emitted by high beam light emitting device 11 illuminates a predetermined area intended to be illuminated. In other words, light leaking from high beam light emitting device 11 can be reduced, which means power can be efficiently used to illuminate a predetermined area intended to be illuminated. Accordingly, power consumption can be reduced.

Note that in the above embodiment and variation, first light restrictor 51 and second light restrictor 60 are exemplified as being a portion of the outer surface of shield 40 and a portion of the inner surface of shield 40, respectively, but first light restrictor 51 and second light restrictor 60 are not limited to this example. For example, first light restrictor and second light restrictor may be a portion of heat sink 30.

Figure 17:
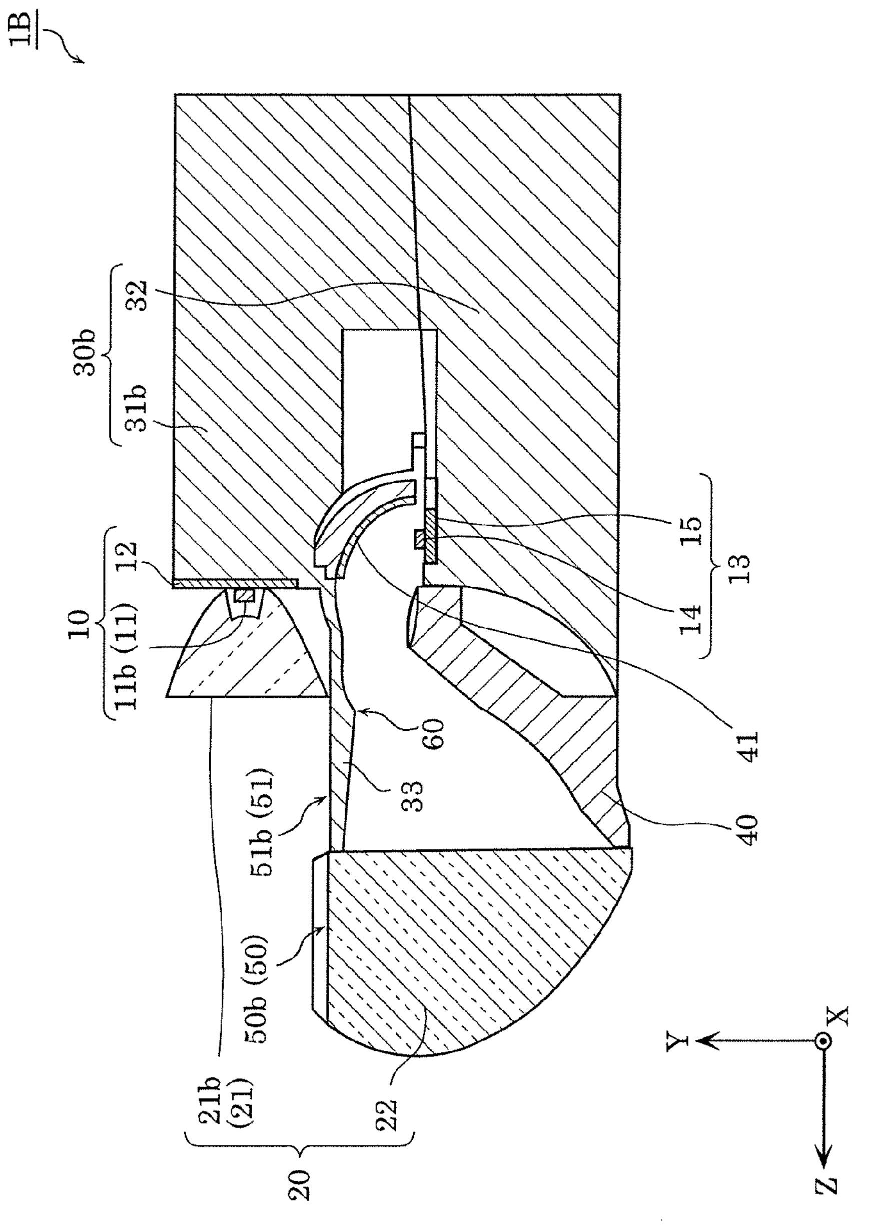
FIG. 17 is a cross sectional view of a lighting apparatus according to another variation of an embodiment of the present disclosure.

FIG. 17 is a cross sectional view of a lighting apparatus according to another variation of the above embodiment. Note that FIG. 17 illustrates a cross section taken at line B-B illustrated in FIG. 14.

As illustrated in FIG. 17, lighting apparatus 1B according to this variation includes heat sink 30*b* in place of heat sink 30. Heat sink 30*b* includes first heat sink 31*b* in place of first heat sink 31.

First heat sink 31*b* includes extension 33 extending forward, as illustrated in FIG. 17. Extension 33 is disposed between high beam lamp 3 and low beam lamp 4. More specifically, extension 33 is disposed between (i) high beam light source module 10 and (ii) shield 40 and low beam light source module 13.

First light restrictor 51 and second light restrictor 60 form the outer surface of extension 33. More specifically, the top surface of extension 33 is first light restrictor 51, and the bottom surface of extension 33 is second light restrictor 60.

In this way, lighting apparatus 1B according to this variation includes base 2, heat sink 30*b*, and shield 40 that defines a predetermined low beam cut-off line, and first light restrictor 51 is a portion of the outer surface of heat sink 30*b*.

This makes it possible to reduce the overall size of lighting apparatus 1B since a portion of the outer surface of heat sink 30 is used as first light restrictor 51. Moreover, this configuration makes it possible to use fewer parts than when second light restrictor 60 is included as a separate component.

Other Variations

Although the lighting apparatus, automobile, etc., according to the present disclosure are described based on an embodiment, the present disclosure is not limited to this embodiment.

For example, in the above embodiment, second collimating lens 21*c* is exemplified as having a truncated conical shape and being disposed at an angle; but second collimating lens 21*c* is not limited to this example. For example, second collimating lens 21*c* may have the shape of a truncated cone that is sliced at an angled. In other words, the front surface (surface from which light exits) of the truncated cone may be angled with respect to the axis of the truncated cone.

Moreover, for example, the optical axis may be angled by treating the surface of the collimating lens. More specifically, a microlens may be formed in the front surface of the collimating lens to change the direction of travel of light. In this case, the surface of the collimating lens in the vicinity of the peripheral edge of the lens in particular may be untreated. This increases the ability of the collimating lens to collect light even further.

Moreover, for example, in the above embodiment, second high beam area of illumination 242 is exemplified as having a horizontal width that is greater than the horizontal width of first high beam area of illumination 241, but this example is not limiting. For example, first high beam area of illumination 241 may have a horizontal width that is greater than the horizontal width of second high beam area of illumination 242. More specifically, second collimating lens 21*c* may have a shape that is closer to a true circle than first collimating lens 21*a* and first collimating lens 21*b* are.

Moreover, for example, the center of the area of illumination of first collimating lens 21*a* and first collimating lens 21*b*—that is, the center of first high beam area of illumination 241—is exemplified as being located at the intersection of horizontal line 220 and vertical line 221, but this example is not limiting. The center of first high beam area of illumination 241 may be offset from the intersection of horizontal line 220 and vertical line 221 toward oncoming traffic lane 210 or the shoulder of the road In other words, the respective areas of illumination, and centers thereof, formed by first high beam lamp 3*a* and second high beam lamp 3*c* are not limited to the above example. Moreover, lighting apparatus 1 may include a third high beam lamp that forms a third area of illumination different in shape from both first high beam area of illumination 241 and second high beam area of illumination 242. In this case, lighting apparatus 1 may include the third high beam lamp as a substitute for first high beam lamp 3*b* and, alternatively, may include the third high beam lamp in addition to first high beam lamp 3*a*, first high beam lamp 3*b*, and second high beam lamp 3*c*.

Moreover, for example, in the above embodiment, high beam light source module 10 and low beam light source module 13 are exemplified as being vertically offset from each other, but this example is not limiting. For example, high beam light source module 10 and low beam light source module 13 may be aligned along a single horizontal line. Moreover, both high beam light emitting device 11 and low beam light emitting device 14 may be mounted on a single substrate.

Moreover, for example, in the above embodiment, first light restrictor 50, first light restrictor 51, and second light restrictor 60 are exemplified as being a portion of base 2 or lens body 20, but the present invention is not limited to this example. The lighting apparatus according to the above embodiment may include first light restrictor 50, first light restrictor 51, and second light restrictor 60 as components separate from base 2 and lens body 20. The separate components may be, for example, held in place by base 2 or lens body 20.

Moreover, for example, in the above embodiment, first light restrictor 50 is exemplified as reflective surface 50*a*, reflective surface 50*b*, and reflective surface 50*c*, but first light restrictor 50 may be a light absorbing surface that absorbs light. For example, reflective surface 50*a*, reflective surface 50*b*, and reflective surface 50*c* may be colored black to make the reflective surfaces light absorbing surfaces.

Moreover, for example, in the above embodiment, vehicle body 110 is exemplified as including two lighting apparatuses 1 (two headlights 120), but vehicle body 110 is not limited to this example. For example, vehicle body 110 may include three or more lighting apparatuses 1, such as two lighting apparatuses 1 on the right side and two lighting apparatuses 1 on the left side, and, alternatively, may include only one lighting apparatus 1.

For example, in the above embodiment, lighting apparatus 1 is exemplified as being applied to a headlight that projects a high beam and a low beam, but lighting apparatus 1 may be applied to an auxiliary light such as a fog light or a daylight/daytime running light (DRL).

Moreover, although the automobile is exemplified as a four-wheeled automobile in the above embodiment, the automobile may be other automobiles such as a two-wheeled automobile.

Moreover, in the above embodiment, the light emitting devices are exemplified as LEDs, but the light emitting devices may be semiconductor lasers, organic electroluminescent (EL) devices, or non-organic EL devices.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus for vehicle use that projects light forward, the lighting apparatus comprising:

a base;

a low beam light emitting device disposed on the base;

a high beam light emitting device disposed on the base;

a lens body disposed in front of the low beam light emitting device and the high beam light emitting device; and a first light restrictor disposed in front of the high beam light emitting device, the first light restrictor restricting light emitted by the high beam light emitting device from traveling downward, wherein the lens body includes:

a low beam lens unit disposed in front of the low beam light emitting device; and a high beam lens unit disposed in front of the high beam light emitting device, the first light restrictor positioned in front of the high beam lens unit.

2. The lighting apparatus according to claim 1, wherein the low beam lens unit has a rear surface, the high beam lens unit has a front surface, and the front surface and the rear surface are substantially flush.

3. The lighting apparatus according to claim 1, wherein the low beam lens unit and the high beam lens unit are integrally formed.

4. The lighting apparatus according to claim 1, wherein the base includes:

a heat sink; and a shield that defines a predetermined low beam cut-off line, and the first light restrictor is a portion of an outer surface of the heat sink.

5. An automobile comprising:

the lighting apparatus according to claim 1;

a vehicle body including the lighting apparatus in a front portion; and a lighting controller configured to turn on the low beam light emitting device and the high beam light emitting device when high beams are turned on; and an engine controller connected to the lighting controller.

6. A lighting apparatus for vehicle use that projects light forward, the lighting apparatus comprising:

a base;

a low beam light emitting device disposed on the base;

a high beam light emitting device disposed on the base;

a lens body disposed in front of the low beam light emitting device and the high beam light emitting device; and a first light restrictor disposed in front of the high beam light emitting device, the first light restrictor restricting light emitted by the high beam light emitting device from traveling downward, wherein the lens body includes:

a low beam lens unit disposed in front of the low beam light emitting device; and a high beam lens unit disposed in front of the high beam light emitting device, the first light restrictor comprises a portion of an outer surface of the low beam lens unit.

7. The lighting apparatus according to claim 6, wherein the low beam lens unit has a rear surface, the high beam lens unit has a front surface, and the front surface and the rear surface are substantially flush.

8. The lighting apparatus according to claim 6, wherein the low beam lens unit and the high beam lens unit are integrally formed.

9. An automobile comprising:

the lighting apparatus according to claim 6;

a vehicle body including the lighting apparatus in a front portion; and a lighting controller configured to turn on the low beam light emitting device and the high beam light emitting device when high beams are turned on; and an engine controller connected to the lighting controller.

10. A lighting apparatus for vehicle use that projects light forward, the lighting apparatus comprising:

a base;

a low beam light emitting device disposed on the base;

a high beam light emitting device disposed on the base;

a lens body disposed in front of the low beam light emitting device and the high beam light emitting device; and a first light restrictor disposed in front of the high beam light emitting device, the first light restrictor restricting light emitted by the high beam light emitting device from traveling downward, wherein the base includes:

a heat sink; and a shield that defines a predetermined low beam cut-off line, and the first light restrictor comprises a reflective surface that reflects light and is a portion of an outer surface of the shield.

11. The lighting apparatus according to claim 10, wherein the lens body includes:

a low beam lens unit disposed in front of the low beam light emitting device; and a high beam lens unit disposed in front of the high beam light emitting device, wherein the low beam lens unit and the high beam lens unit are integrally formed.

12. The lighting apparatus according to claim 10, wherein the lens body includes:

a low beam lens unit disposed in front of the low beam light emitting device; and a high beam lens unit disposed in front of the high beam light emitting device, wherein the low beam lens unit has a rear surface, the high beam lens unit has a front surface, and the front surface and the rear surface are substantially flush.

13. An automobile comprising:

the lighting apparatus according to claim 10;

a vehicle body including the lighting apparatus in a front portion; and a lighting controller configured to turn on the low beam light emitting device and the high beam light emitting device when high beams are turned on; and an engine controller connected to the lighting controller.

14. A lighting apparatus for vehicle use that projects light forward, the lighting apparatus comprising:

a base;

a low beam light emitting device disposed on the base;

a high beam light emitting device disposed on the base;

a lens body disposed in front of the low beam light emitting device and the high beam light emitting device;

a first light restrictor disposed in front of the high beam light emitting device, the first light restrictor restricting light emitted by the high beam light emitting device from traveling downward, and a second light restrictor disposed in front of the low beam light emitting device, the second light restrictor restricting light emitted by the low beam light emitting device from traveling upward.

15. The lighting apparatus according to claim 14, wherein the base includes:

a heat sink; and a shield that defines a predetermined low beam cut-off line, and the second light restrictor is a portion of an inner surface of the shield.

16. The lighting apparatus according to claim 14, wherein the lens body includes:

a low beam lens unit disposed in front of the low beam light emitting device; and a high beam lens unit disposed in front of the high beam light emitting device, wherein the low beam lens unit has a rear surface, the high beam lens unit has a front surface, and the front surface and the rear surface are substantially flush.

17. The lighting apparatus according to claim 14, wherein the lens body includes:

a low beam lens unit disposed in front of the low beam light emitting device; and a high beam lens unit disposed in front of the high beam light emitting device, wherein the low beam lens unit and the high beam lens unit are integrally formed.

18. An automobile comprising:

the lighting apparatus according to claim 14;

a vehicle body including the lighting apparatus in a front portion; and a lighting controller configured to turn on the low beam light emitting device and the high beam light emitting device when high beams are turned on; and an engine controller connected to the lighting controller.

* * * * *